(12) United States Patent
Gentry et al.

(10) Patent No.: US 9,387,928 B1
(45) Date of Patent: Jul. 12, 2016

(54) MULTI-USE UAV DOCKING STATION SYSTEMS AND METHODS

(71) Applicant: Amazon Technologies, Inc., Seattle, WA (US)

(72) Inventors: Nicholas Kristofer Gentry, Seattle, WA (US); Raphael Hsieh, Seattle, WA (US); Luan Khai Nguyen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 14/576,082

(22) Filed: Dec. 18, 2014

(51) Int. Cl.
*G05D 1/00* (2006.01)
*G05D 3/00* (2006.01)
*G06F 7/00* (2006.01)
*G06F 17/00* (2006.01)
*B64C 39/02* (2006.01)
*B64F 1/12* (2006.01)
*G06Q 10/08* (2012.01)

(52) U.S. Cl.
CPC .............. *B64C 39/024* (2013.01); *B64F 1/12* (2013.01); *G05D 1/0011* (2013.01); *G06Q 10/0832* (2013.01); *B64C 2201/128* (2013.01); *B64C 2201/146* (2013.01); *B64C 2201/18* (2013.01)

(58) Field of Classification Search
CPC .............. G07C 5/008; G07C 9/00309; G07C 2009/00793; B60R 25/24; F02N 11/0807
USPC .................................................. 701/2
See application file for complete search history.

(56) References Cited

U.S. PATENT DOCUMENTS

| | | | | |
|---|---|---|---|---|
| 2015/0336669 | A1* | 11/2015 | Kantor | G01C 21/3415 701/3 |
| 2015/0339933 | A1* | 11/2015 | Batla | G08G 5/0069 701/120 |
| 2015/0379874 | A1* | 12/2015 | Ubhi | G01S 5/0027 701/3 |

* cited by examiner

*Primary Examiner* — Maceeh Anwari
(74) *Attorney, Agent, or Firm* — Lee & Hayes, PLLC

(57) ABSTRACT

Systems and methods for providing a series of multiuse UAV docking stations are disclosed. The docking stations can be networked with a central control and a plurality of UAVs. The docking stations can include a number of services to facilitate both UAV guidance and maintenance and community acceptance and benefits. The docking stations can include package handling facilities and can act as a final destination or as a delivery hub. The docking stations can extend the range of UAVs by providing recharging/refueling stations for the UAVs. The docking stations can also include navigational aid to guide the UAVs to the docking stations and to provide routing information from the central control. The docking stations can be incorporated into existing structures such as cell towers, light and power poles, and buildings. The docking stations can also comprise standalone structures to provide additional services to underserved areas.

22 Claims, 19 Drawing Sheets

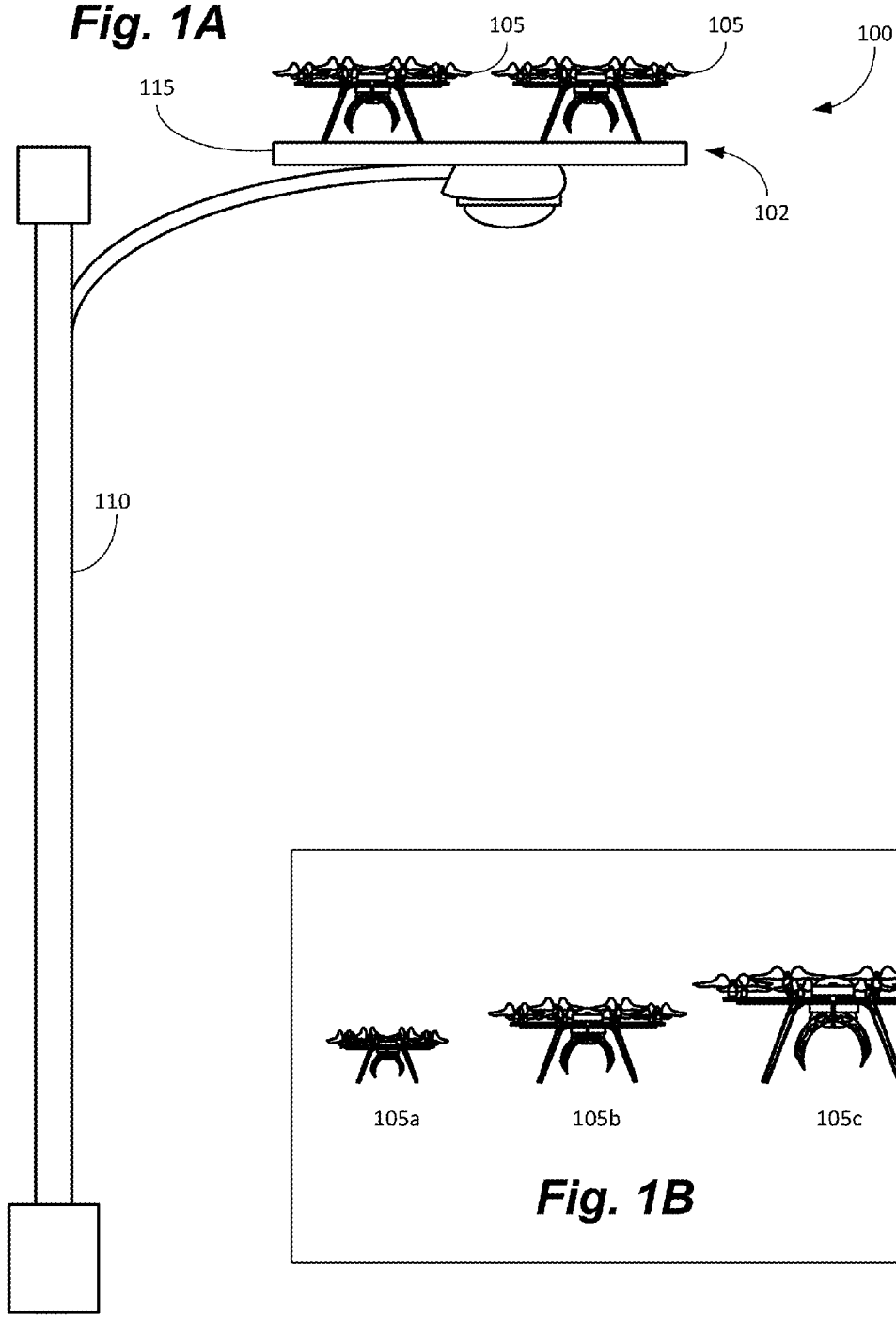

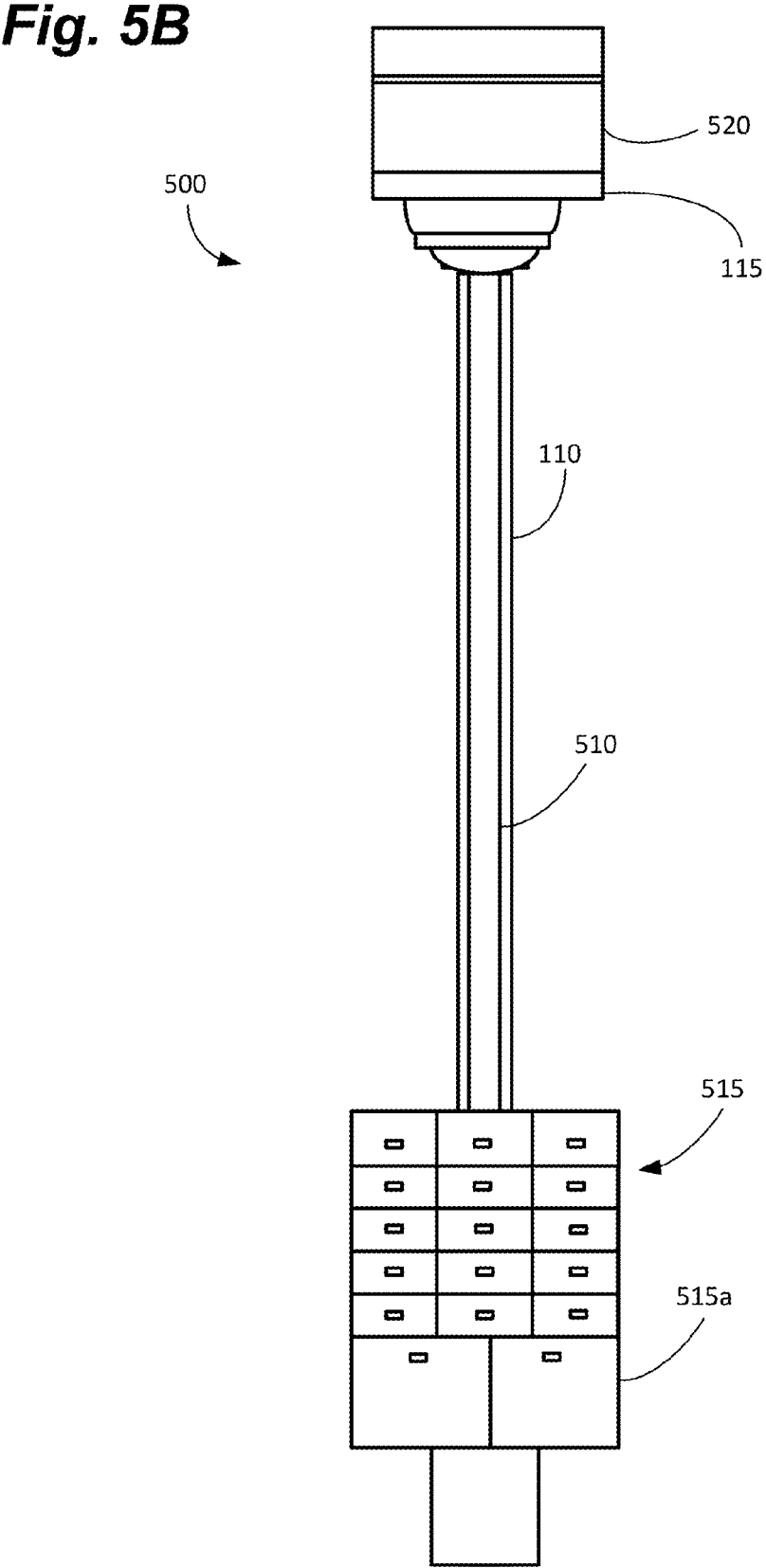

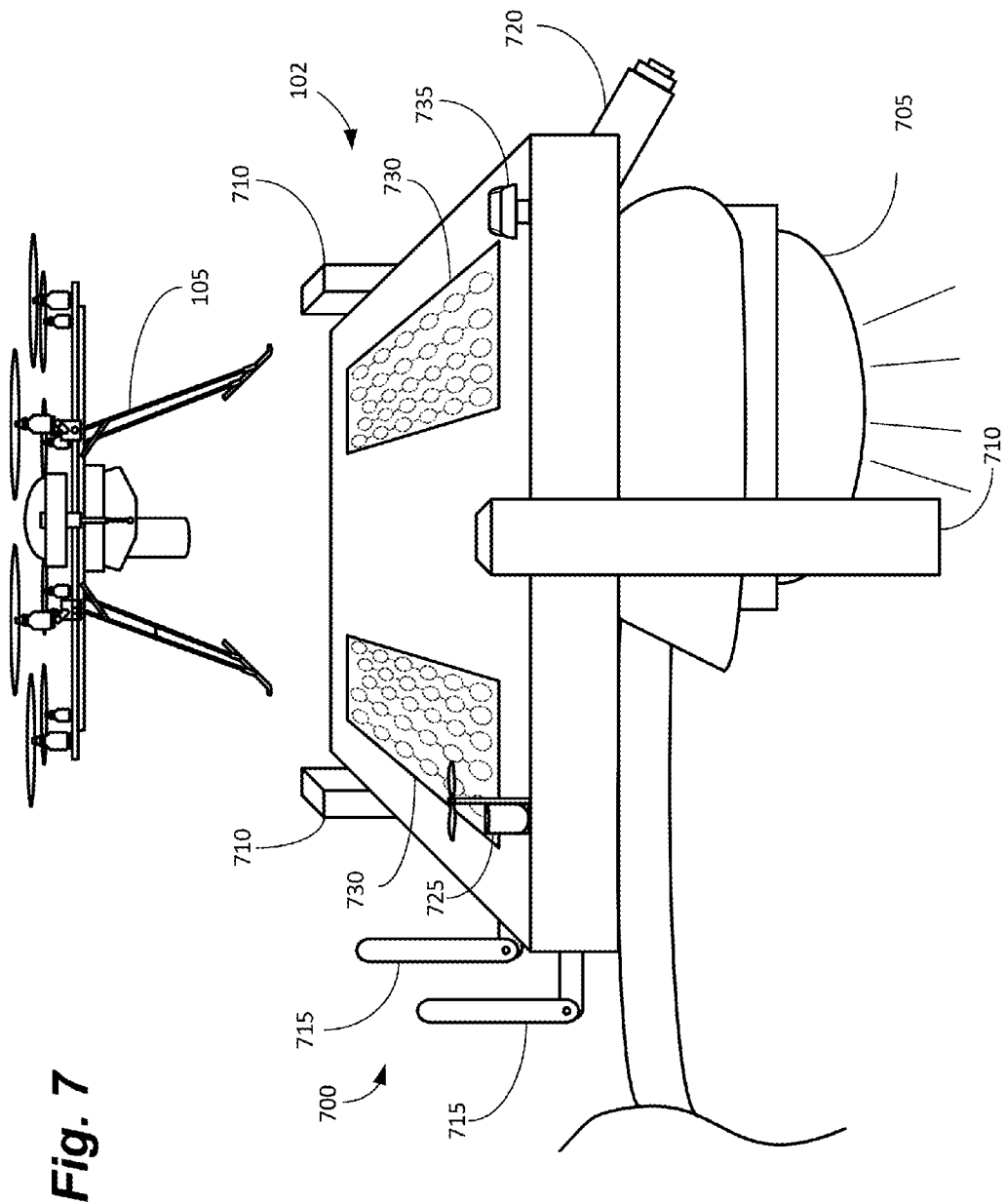

To Fig. 10B

MULTI-USE UAV DOCKING STATION SYSTEMS AND METHODS

BACKGROUND

Unmanned aerial vehicles (UAVs) comprise a variety of vehicles, from conventional fixed wing airplanes, to helicopters, to ornithopters (i.e., machines that fly like birds), and are used in a variety of roles. They can be remotely piloted by a pilot on the ground or can be autonomous or semi-autonomous vehicles that fly missions using preprogrammed coordinates, GPS navigation, etc. UAVs can include remote control helicopters and airplanes for the hobbyist, for example.

UAVs may be equipped with cameras to provide imagery during flight, which may be used for navigational or other purposes, e.g., identify a house address, etc. UAVs can also be equipped with sensors to provide local weather and atmospheric conditions, radiation levels, and other conditions. UAVs may also include cargo bays, hooks, or other means for carrying payloads.

Newer generation UAVs may also provide significant payload capabilities. As a result, UAVs can also be used for delivering packages, groceries, mail, and other items. The use of UAVs for deliveries can reduce costs and increase speed and accuracy. The range provided by current UAV technology, however, makes deliveries over a wide area—e.g., throughout a city, or even a portion of a city—difficult.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A depicts an unmanned aerial vehicle ("UAV") docking station on a convention streetlight, in accordance with some examples of the present disclosure.

FIG. 1B depicts a variety of UAV sizes, in accordance with some examples of the present disclosure.

FIGS. 5A-5B depict a UAV docking station with an integrated package locker, in accordance with some examples of the present disclosure.

FIG. 7 depicts a UAV docking station with a plurality of communications accessories, in accordance with some examples of the present disclosure.

DETAILED DESCRIPTION

Figure 1C:
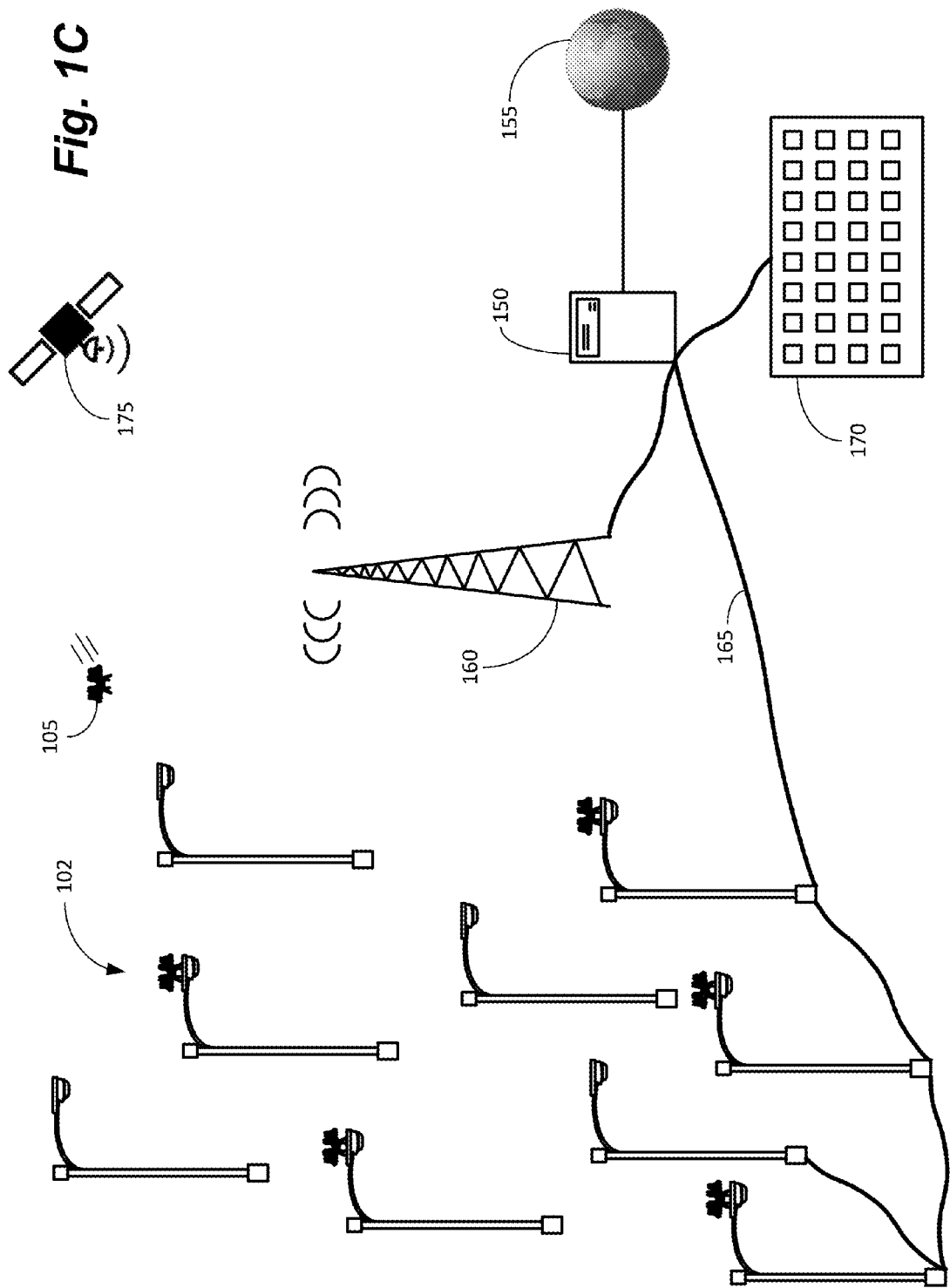
FIG. 1C depicts a network of docking stations for UAVs, in accordance with some examples of the present disclosure.

Examples of the present disclosure relate generally to unmanned aerial vehicles, or "UAVs," and specifically to a system of docking stations for UAVs to increase the range and safety of UAVs. The docking stations may incorporate a number of features to enable UAVs to fly longer routes, to fly routes more accurately, and to provide shelter during adverse conditions. In some examples, the docking stations may also provide additional services to the communities in which they are installed. In some examples, the docking stations can also include various package handling abilities to facilitate package delivery. In some examples, the docking stations may be networked to provide central command and control for the UAVs.

To simplify and clarify explanation, the disclosure is described herein as a system and method for enabling UAVs to provide delivery and other services. One skilled in the art will recognize, however, that the disclosure is not so limited. While, the system may be described as a system to deliver packages, it should be understood that the system may just as easily be used to delivery groceries, mail, movies, prescriptions, and other items. In addition, the system is described herein for use with UAVs, but could also be applied to other vehicles using different form factors such as ground-based docking stations for autonomous delivery vans.

The vehicles, methods, and systems described hereinafter as making up the various elements of the present disclosure are intended to be illustrative and not restrictive. Many suitable vehicles, energy sources, navigational aids, and networks that would perform the same or a similar function as the systems described herein are intended to be embraced within the scope of the disclosure. Such other systems and methods not described herein can include, but are not limited to, vehicles, systems, networks, and technologies that are developed after the time of the development of the disclosure.

As shown in FIG. 1A, examples of the present disclosure can comprise a system 100 for providing a plurality of docking stations for one or more UAVs 105. The docking station 102 portion of the system 100 is shown as installed on a conventional pole-mounted street light 110. As discussed below, however, the system 100 could also be installed on other existing structures such as cell towers, church steeples, office buildings, parking decks, radio towers, telephone/electrical poles, and other vertical structures (collectively, "poles"). The system 100 can comprise an elevated landing platform 115 to enable one or more UAVs 105 to land. This can enable the UAVs 105 to, for example, avoid bad weather, recharge/refuel, drop off packages, pick-up packages, communicate with a central control system, reset navigation systems, and await further instructions, among other things.

In some examples, the elevated landing platform 115 can be sized and shaped to enable two or more UAVs 105 to land at the same time. In this configuration, the system 100 can also comprise one or more locating devices such as, for example, pressure sensors, laser scanners, video cameras, or other means to enable the system 100 to locate the drones 105 on the elevated landing platform 115. This can enable the system 100 to ensure, for example, that a first drone 105 drops off a package, while a seconds drone 105 recharges and continues on.

As mentioned above, a limiting factor with current UAV technology is the relatively short range available when a UAV is carrying a heavy or large payload. In other words, while a UAV may have a range of several, or even tens of miles, unladen, this range can drop to less than a mile while carrying a package. Of course, larger UAVs with larger payloads and ranges are available, but the tradeoff between range and payload remains a significant concern in UAV system design.

To this end, as shown in FIG. 1B, in some examples, the system 100 can include a variety of different UAVs 105. In some examples, the system 100 can comprise small UAVs 105a, medium UAVs 105b, and large UAVs 105c. In some examples, the UAVs 105 can be categorized by payload capacity. For example, small UAVs 105a could be capable of from approximately 0-5 lbs., while medium UAVs 105b could be capable of carrying between 0-10 lbs., while the large UAVs 105c could be capable of carrying up to 50 lbs. Of course, other payload capacities, including payloads up to 500 lbs and more are possible. These ranges are intended to be exemplary and are not in any way limiting.

In this manner, the system 100 can assign packages to a suitable sized UAV 105. Small packages can be assigned to small UAVs 105a, for example, to reduce costs and/or increase delivery speed. Larger packages, on the other hand, can be assigned to medium 105b or large 105c UAVs with larger payloads. In some examples, the packages can also be assigned to UAVs 105 based on prevailing weather conditions. In other words, a small or medium package can nonetheless be assigned to a large UAV 105c due to strong winds, for example. Of course, the UAVs 105 can be classified in a number of ways including, but not limited to, size, energy efficiency, payload, range, and top speed.

As shown in FIG. 1C, in some examples, the system 100 can also comprise a plurality of networked docking stations 102. The system 100 can comprise a central control 150, which can comprise, for example, a networked computer or server to provide information and commands to the plurality of UAVs 105. In some examples, the central control 150 can be in communication with the docking stations 102 via a wireless connection 160, a wired connection 165, or combinations thereof. In some examples, the central control 150 can be in constant communication with the UAVs 105 via a cellular, radio frequency (RF), or other suitably long-range wireless connection. In other examples, the central control 150 can be in communication with the UAVs 105 when they are on, or in sufficient proximity, to a docking station 102.

In some examples, the central control 150 can also comprise an internet connection 155. The central control 150 can also be in communication, via either the internet connection 155 or a dedicated connection, with a local or regional package handling center or central facility 170. The internet connection 155 can enable the central control 150 to retrieve weather and package data, for example, to enable the system 100 to route UAVs 105 in an efficient manner, while avoiding bad weather when possible. In this manner, UAVs 105 can retrieve a package from a central facility 170 (or a docking station 102), and be routed in an efficient manner to their final destination via one or more docking stations 102.

The route for the UAV 105 can be calculated by the central control 150 and can be, for example, the most direct path, the path with the most favorable atmospheric conditions (e.g., without headwinds), or the path that moves the UAV 105 from docking station to docking station without exceeding the UAV's 105 range. In some examples, the central control 150 can adjust the UAVs' 105 routes dynamically based on, for example, the package weight and/or size, changes in weather (e.g., increased headwinds), package priority, or traffic from other UAVs 105 or other air traffic.

The central control 150 can also be in communication with the docking stations 102 via a wired or wireless connection. This can enable the UAVs 105 to communicate with the central control 150 when they are proximate a docking station. In addition, as discussed below, the docking stations 102 can also comprise weather stations, for example, to provide weather data including local weather conditions. In addition, in some configurations, the docking stations 102 can also comprise automated package handling systems, which can be in communication with the central control 150 to indicate, for example, when a package arrives at the package handling system or when a package is retrieved from same.

In some examples, one or more of the central control 150, the UAVs 105, the central facility 170, and the docking stations 102 can be equipped with GPS receivers in communication with one or more GPS satellites 175. As mentioned below, in some examples, the docking stations 102 can act as reference points for adjustment and error reduction for the UAV 105 GPS systems. In some examples, the central control 150 can use GPS coordinates as waypoints for routing flight paths.

Figure 2A:
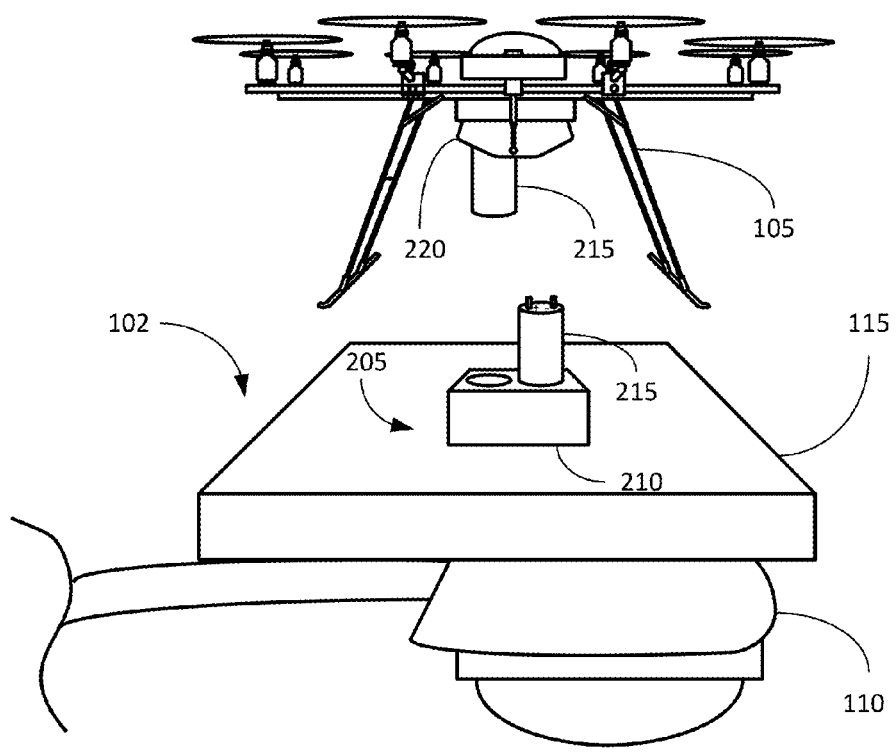
FIGS. 2A-2C depict the UAV docking station of FIG. 1 equipped with a recharging station, in accordance with some examples of the present disclosure.
Figure 2B:
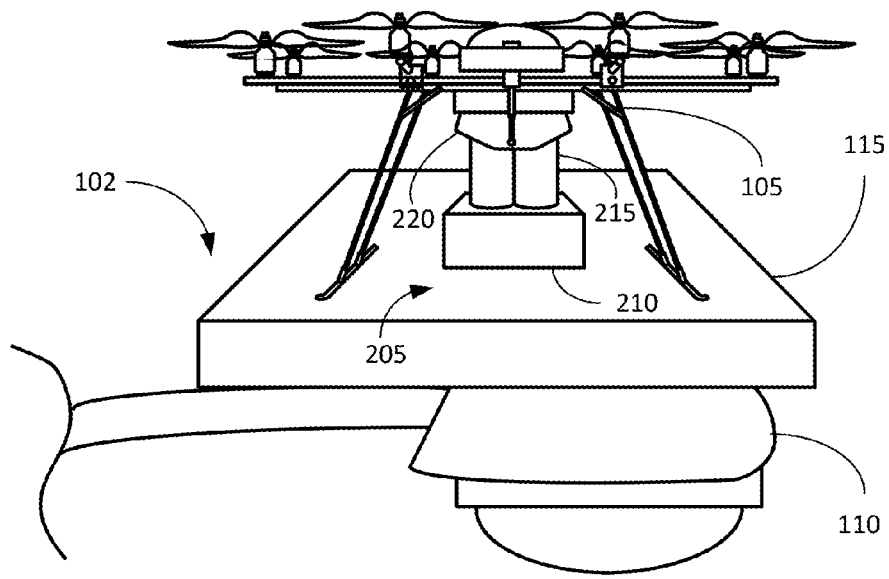
Figure 2C:
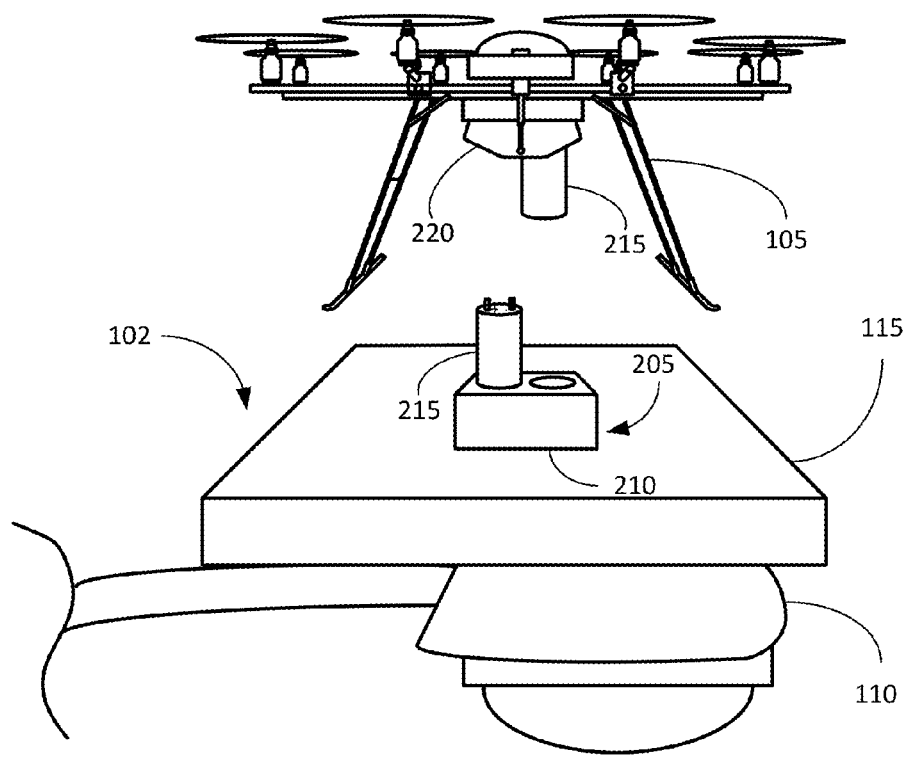

In some examples, to facilitate longer routes, the UAV docking stations 102 can comprise a recharging station 205, as shown in FIGS. 2A-2C. As shown in FIG. 2A, the recharging station 205 can comprise a modular power source 215 for the UAV 105, a power bay 220 located on the UAV 105, and a recharging base 210. As shown, in some examples, the recharging station 205 can comprise a battery charging base 210 and one or more batteries, or battery packs, 215. In this configuration, the UAV 105 can be powered by a single battery 215, for example, but can have a battery bay 220 configured for two or more battery packs 215. As the UAV 105 approaches the docking station 102, therefore, the UAV 105 can position itself to land on the recharging station 205 (FIG. 2B), drop off a discharged battery 215 and pick-up a charged battery 215 (FIG. 2C). Thus, the UAV 105 can take off almost immediately to continue its route and, when it takes off, the discharged battery 215 is left in the charging stand to charge.

In addition, while described as a battery pack 215, the power supply for the UAV 105 could also be a hydrocarbon fuel, a fuel cell, solar energy, or other energy source. If, for example, the UAV 105 uses one or more nitromethane burning engines, the battery packs 215 could be replaced with modular fuel cells and the recharging station 205 could comprise a refueling station. As the UAV approaches the docking station 102, therefore, it simply exchanges an empty fuel tank for a full one. Of course, the UAV could also use gasoline, diesel, Jet A, propane, methane, ethanol, methanol, or other hydrocarbon or alcohol based fuels. The use of appropriately spaced recharging (refueling) stations 205 can limitlessly extend the range of the UAV 105.

In addition, while described above as a battery pack 215, the energy source could also be a number of other electrical energy sources such as, for example, a fuel cell, a solar storage system, or a capacitor. In addition, there are myriad types of batteries and the battery packs 215 can comprise a variety of different battery types including, but not limited to, lithium ion, nickel cadmium, nickel metal hydride, lithium polymer, and combinations thereof. Using a capacitor, for example, can enable the battery pack 215 to be recharged quickly obviating the need for multiple battery packs. In addition, while a conventional contact type battery charger is discussed, other types of chargers such as, inductive, RF, and other non-contact charging systems are contemplated herein. Finally, docking stations 102 configured to enable more than one UAV 105 to land can comprise a plurality of recharging stations 205 to enable multiple UAVs 105 to be refueled/recharged at the same time.

Figure 2D:
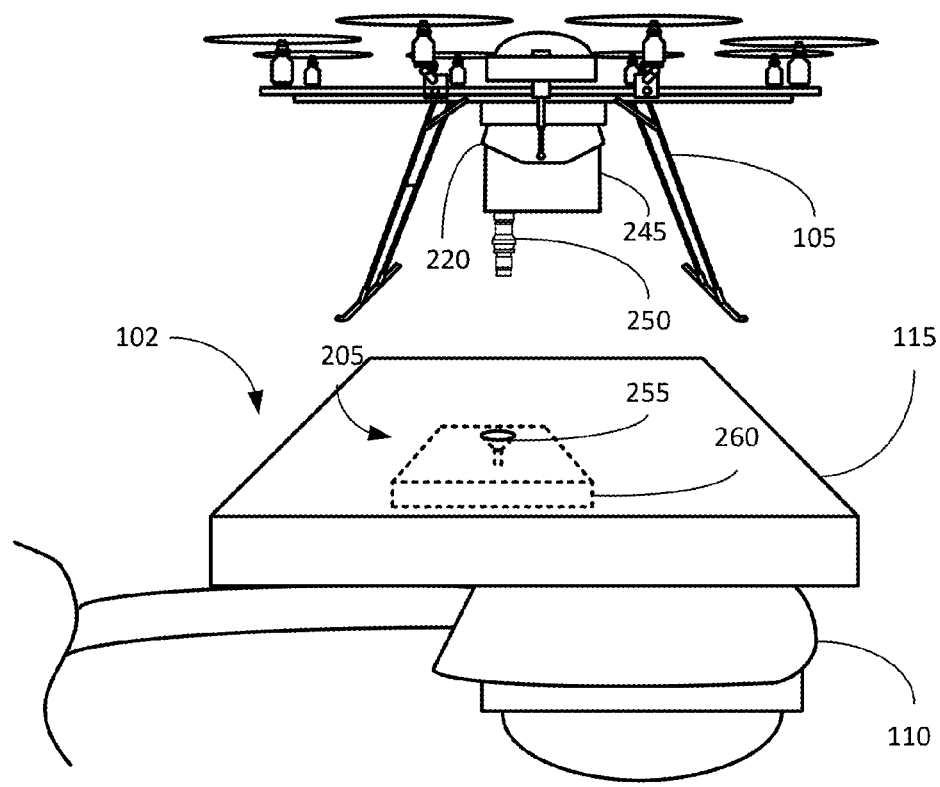
FIGS. 2D-2E depict the UAV docking station of FIG. 1 equipped with a refueling station, in accordance with some examples of the present disclosure.
Figure 2E:
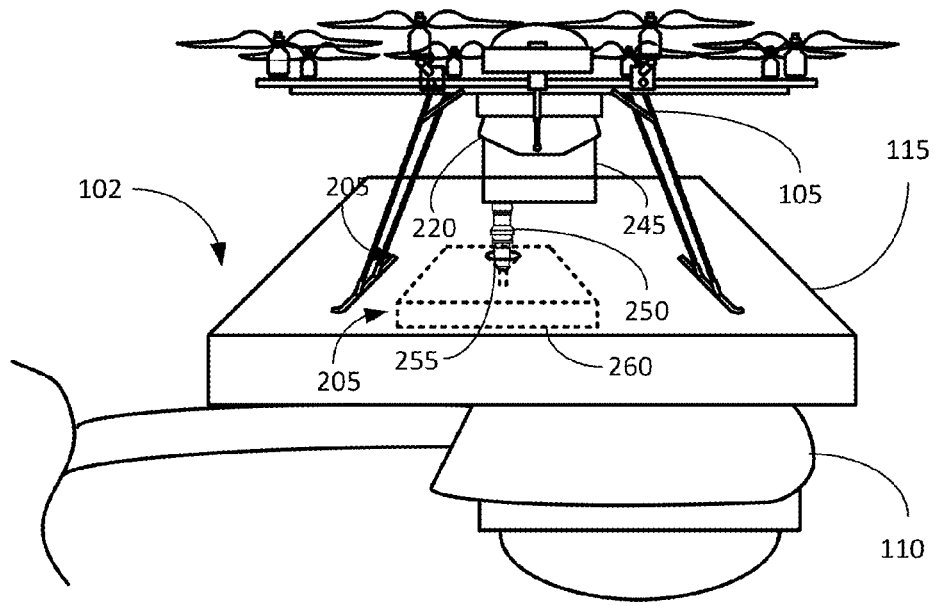

As shown in FIGS. 2D-2E, in some examples, the UAVs 105 can be powered by liquid or gaseous fuels. In this configuration, the UAVs 105 can include fuel tanks 245. In some examples, the power bay 220 can comprise two fuel tank receivers, similar to the battery bay 220 discussed above. In this manner, the UAV 105 can land, drop an empty fuel tank 245, and pick up a full fuel tank 245.

In other examples, as shown in FIG. 2D, the UAVs 105 may comprise a refueling probe 250 engageable with a refueling nozzle 255 on the platform 115. The refueling nozzle 255, in turn, can be in fluid communication with a fuel storage tank 260 in the platform 115 (or somewhere on the docking station 102). In some examples, the refueling nozzle 255 may comprise a cone-shaped receptacle to reduce the maneuvering accuracy required by the UAV 105. When the UAVs 105 land (as shown in FIG. 2E), the refueling probe 250 can engage with the refueling nozzle 255 to enable the system 205 to refill the fuel tank 245.

In still other examples, the UAVs 105 can be stackable. In other words, two or more UAVs 105 can land in the same location on the platform 115 to both increase the capacity of the platform 115 and to provide charging to multiple UAVs 105 at the same time. In some examples, the UAVs 105 can be secured to one another and can include electrical contacts to enable two or more UAVs 105 to be charged by the same charging station 205.

Figure 3A:
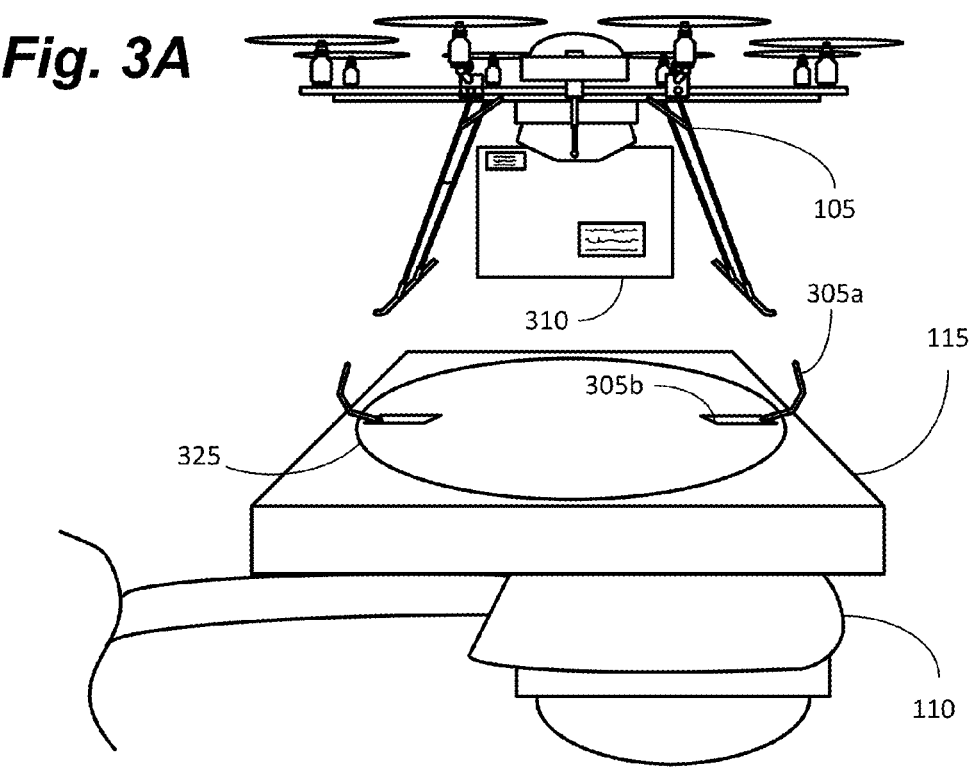
FIGS. 3A-3C depict a first UAV hold-down system, in accordance with some examples of the present disclosure.
Figure 3B:
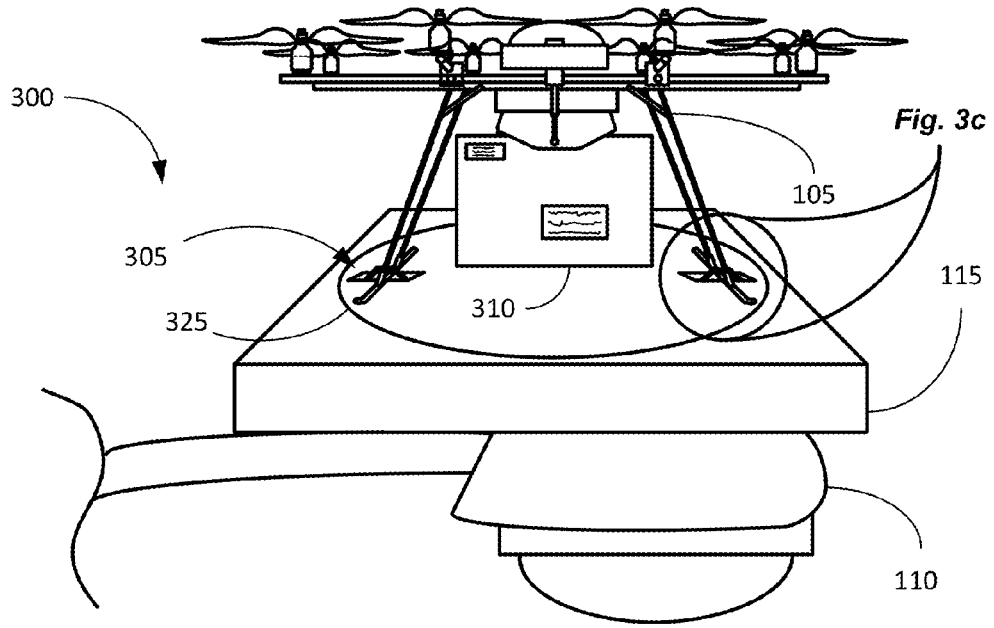
Figure 3C:
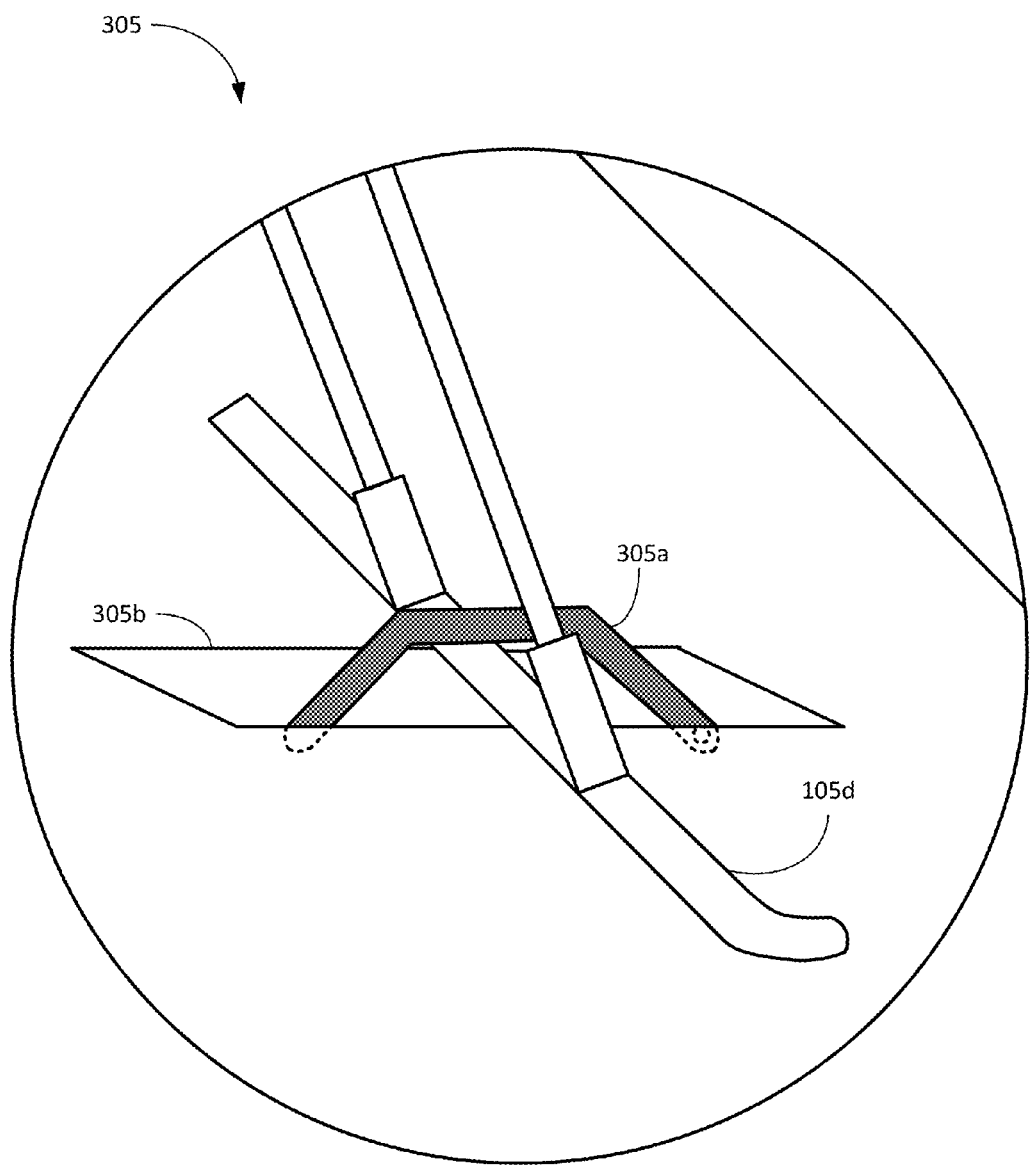

As shown in FIGS. 3A-3C, the docking station 300 can also comprise one or more UAV securing systems 305. In some examples, the UAV securing system 305 can comprise a clamp to hold the UAV 105 securely when on the elevated platform 115. This can enable the UAV 105 to offload packages 310 safely, for example, and can enable the UAV 105 to be secured during high winds and other adverse weather events.

The UAV securing system 305 can comprise one or more clamps 305a stowed in one or more bays 305b on the platform 115. The clamps 305a can be stowed in the bays 305b when not in use, or can simply be in an open position, as shown in FIG. 3A. When the UAV 105 lands, the clamps 305a can be closed to secure the UAV 105 to the platform 115, as shown in FIG. 3B (and in detail in FIG. 3C). In some examples, the clamps 305a can be closed every time the UAV 105 lands. In other examples, the clamps 305a can be closed only when conditions require it to stabilize the UAV 105 (e.g., during high winds). As shown, the clamps 305a can be secured over one or more skids 105d of the UAV 105.

Of course, different UAV 105 landing gear designs (e.g., wheeled) or platform 115 designs may require a variety of designs to secure the UAV 105. The UAV securing system 305 could also comprise a magnet, such as an electromagnet. In this configuration, the electromagnet may be energized when the UAV 105 is on the platform 115, and de-energized prior to take-off, landing, and/or when no UAV 105 is present. In other examples, the elevated landing platform 115 could comprise a vacuum device, such as a suction cup or vacuum plate (i.e., a perforated plate in the platform to exert a vacuum on a portion of the UAV 105) to secure the UAV 105 to the platform 115.

In some examples, as shown also shown in FIGS. 3A-3B, the elevated platform 115 may also comprise a turntable 325. The turntable 325 can enable the UAV 105 to be rotated while on the platform 115. Rotating the UAV 105 can enable the package 310 to be properly aligned, for example, for handling by the package handling system, discussed below. The turntable 325 can also enable the UAV 105 to be aligned with the recharging system 205, or simply to enable a UAV 105 to take off and land into the wind as the wind shifts.

Figure 4A:
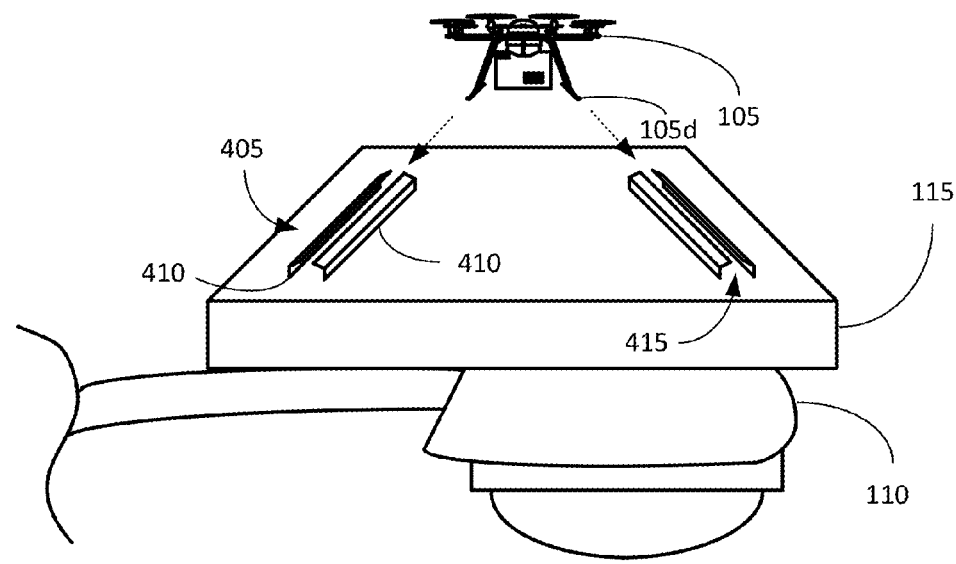
FIGS. 4A-4B depict a second UAV hold-down system, in accordance with some examples of the present disclosure.
Figure 4B:
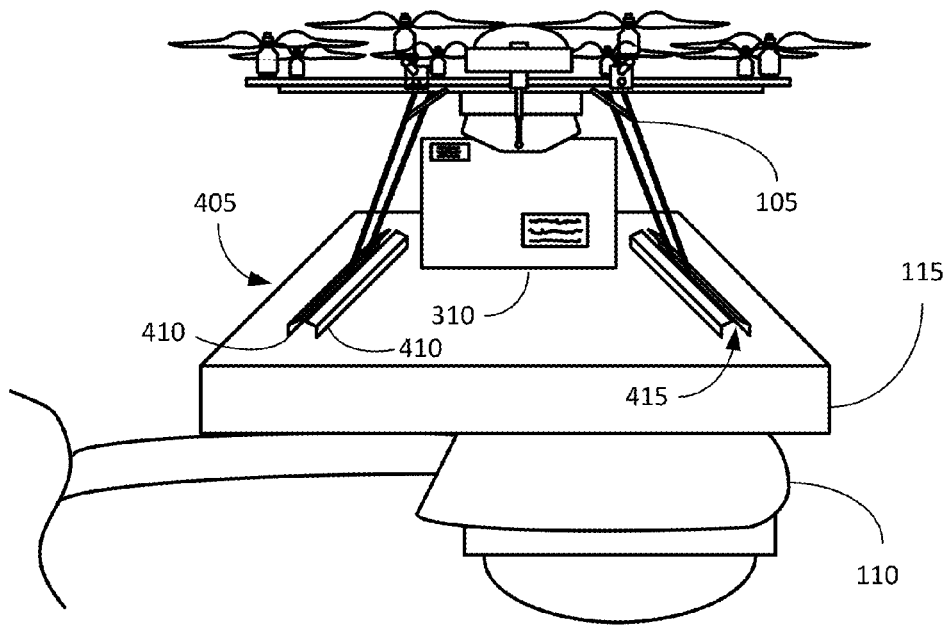

In other examples, as shown in FIGS. 4A and 4B, the platform 115 can include one or more slot-type hold-downs 405. The slot-type hold-downs 405 can comprise opposing brackets 410, for example, disposed on the platform 115 such that a slot 415 is defined therebetween. In this manner, as the UAV 105 approaches the platform 115, it can fly such that its skids 105d (also shown in FIG. 3C) are substantially aligned with the slot 415. As the UAV 105 lands, therefore, the skids are inserted between the brackets 410 and the UAV 105 substantially moves in straight and level flight, or translates, to fully engage the brackets 410. Because the slot 415 is smaller than the diameter of the skids, however, the UAV 105 is secured to the platform. When taking off, the UAV 105 merely hovers slightly, backs off the platform 115, until it clears the brackets 410 and then flies away normally. In some examples like the clamp-type system 305, the brackets 410 can move between an open position and a closed position to decrease the accuracy required to land and engage the UAV.

Figure 5A:
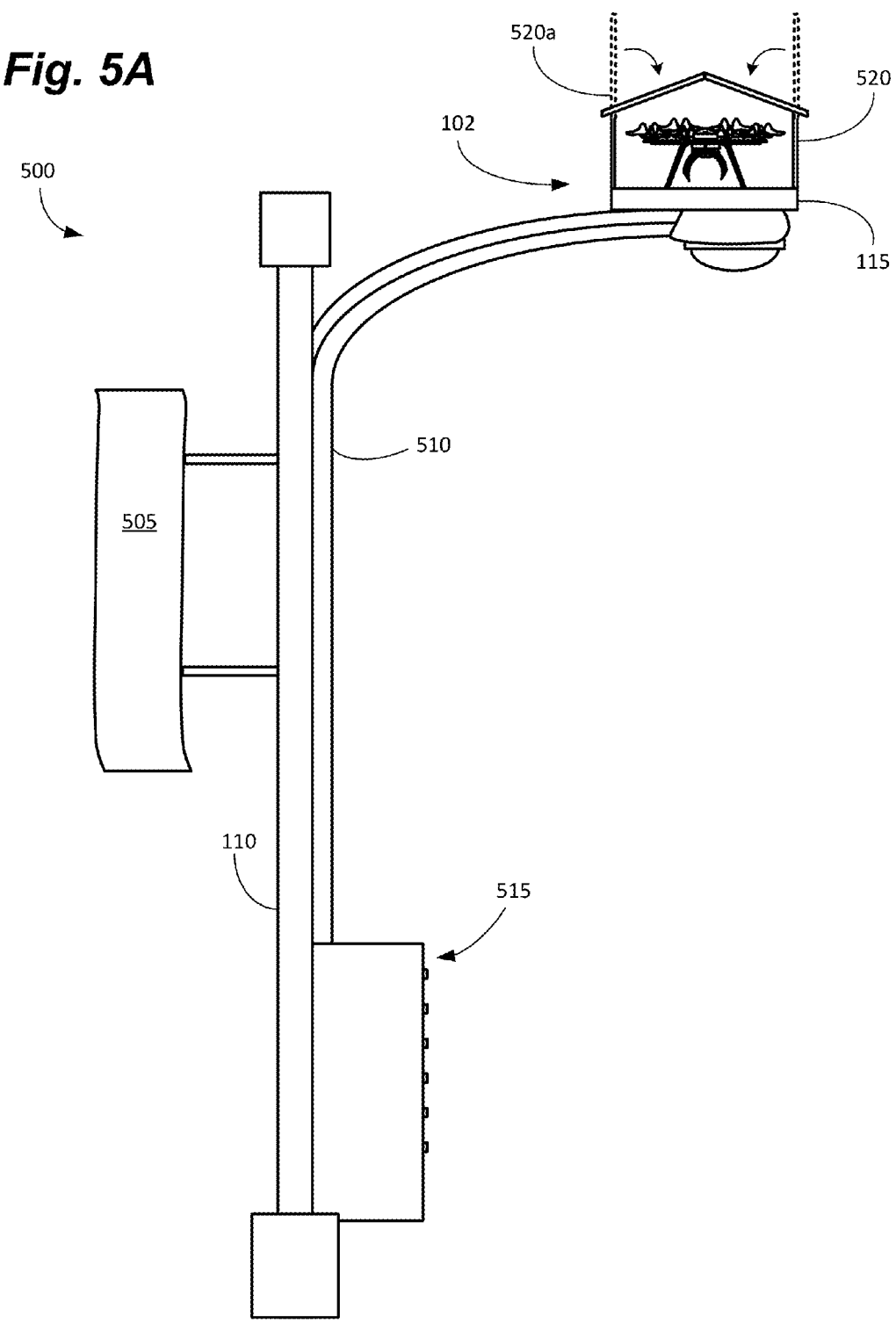

In some examples, as shown in FIGS. 5A-5B, the system 500 can also comprise additional features for improved aesthetics, functionality, and profitability. In some examples, the system 500 can comprise signage 505. This can include, for example, banners, signs, and display screens. In some examples, the signage 505 can comprise advertising to generate additional revenue for the provider. In other examples, the signage 505 can provide information, such as the location number for the docking station 102 to enable users to locate packages, for example, or GPS coordinates to enable users and UAV operators to calibrate their GPS equipment.

In still other examples, the system 500 can comprise a package transfer system 510 and/or a package locker storage system 515. As the name implies, the package transfer system 510 can transfer packages from the UAV 105, to the platform 115, and then to a lower level (e.g., the ground level). In some examples, this can enable the UAV 105 to deliver items to a user or a delivery person on the ground. In other words, in some examples, the UAV 105 can deliver packages to the docking station 500 and the package either can be picked-up there by the addressee or can be delivered to its final destination by a delivery person in a truck, car, on a scooter, or using other transportation means. The package transfer system 510 can comprise, for example, a vacuum tube, dumbwaiter, elevator, or conveyor to transfer the package from the platform to the ground level without damage. In some examples, the package transfer system 510 can utilize gravity and can simply comprise a conduit with one or more gates to direct packages to the correct location. The package transfer system 510 can comprise, for example, a large gate, a medium gate, and a small gate, such that packages of a certain size are routed to an appropriate location in a storage system, as discussed below.

In some examples, the system 500 can also comprise a locker storage system 515. In some examples, the locker storage system 515 and the package transfer system 510 can be separate. In this configuration, packages can be transferred to the ground level by the package transfer system 510. The packages can then be sorted and stored in the locker storage system 515 at the ground level. This can enable customers to pick up packages from the locker storage system 515.

As shown in FIG. 5B, this configuration can also enable delivery personnel to retrieve packages—which can be pre-sorted—from the locker storage system 515 and deliver them to their final destination. All packages in a particular locker 515a, for example, can be addressed to the same zip code, neighborhood, street, or house to enable more efficient local delivery. In some examples, the use of local locker storage systems 515 can enable packages to be delivered without the use of large delivery trucks. In other words, personnel can retrieve packages from a centrally located locker storage system 515. The worker can deliver all of the packages for a first location, and then return to the locker storage system 515 for the packages for a second location. This can enable packages to be delivered via compact car, scooter, or other more efficient means (i.e., more efficient than a large delivery truck), while minimizing the distances covered for delivery and delivery delays.

In other examples, the locker storage system 515 can be in communication with the package transfer system 510 and/or the central control 150 and can include an automated package sorting system. The automated package sorting system can use conveyors, robotics, or other known methods to automatically read and sort packages into an appropriate locker 515a. In some examples, the package sorting system can sort packages based on commands from the central control 150. They can be sorted, for example, in the order they arrive, because the central control 150 can in control of routing the packages and the UAVs 105. In this manner, packages can be placed in an individual storage locker 515a based on, for example, address, zip code, size, or weight.

In some examples, the lockers 515a can comprise coded entry locks to enable users to pick up their package at the locker 515a at a convenient time. Upon delivery to the locker storage system 515, the recipient can be provided with the location of the docking station 500, the locker 515a number, and the code for the lock (e.g., an alphanumeric one-time use access code) via e-mail or text message, for example. The recipient can then retrieve the package at their convenience using the one-time use access code. The locker storage system 515 can then update the status of the locker 515a to empty, assign a new access code, and the locker 515a is ready for reuse.

In some examples, packages not retrieved within a predetermined timeframe (e.g., 10 days) can be returned to the central facility (i.e., the central facility 170 shown in FIG. 1C) for reprocessing or return to the original sender. In some examples, the package can be returned to the platform 115 with the package transfer system 510 for retrieval by a UAV 105. In other examples, the package can simply be returned by a delivery person.

In still other examples, the system 500 can also comprise a shelter 520 for the UAV 105. The shelter 520 can be used instead of, or in conjunction with, the UAV securing system 305. In some examples, the shelter 520 can be a small structure with a roof, as shown in FIG. 5A. In other examples, the shelter 520 can be a retractable tarp or awning, an inflatable shelter, or a mechanized top, similar to a convertible vehicle roof. In other words, in some examples, the shelter 520 can be a permanent structure, while in other examples it can be retractable or inflatable. As shown in FIG. 5A, in some examples, the shelter 520 can comprise a pivoting roof 520a to enable the UAV 105 to more easily land in the shelter 520 (e.g., the UAV 105 can land vertically, horizontally, or a combination thereof).

Figure 6A:
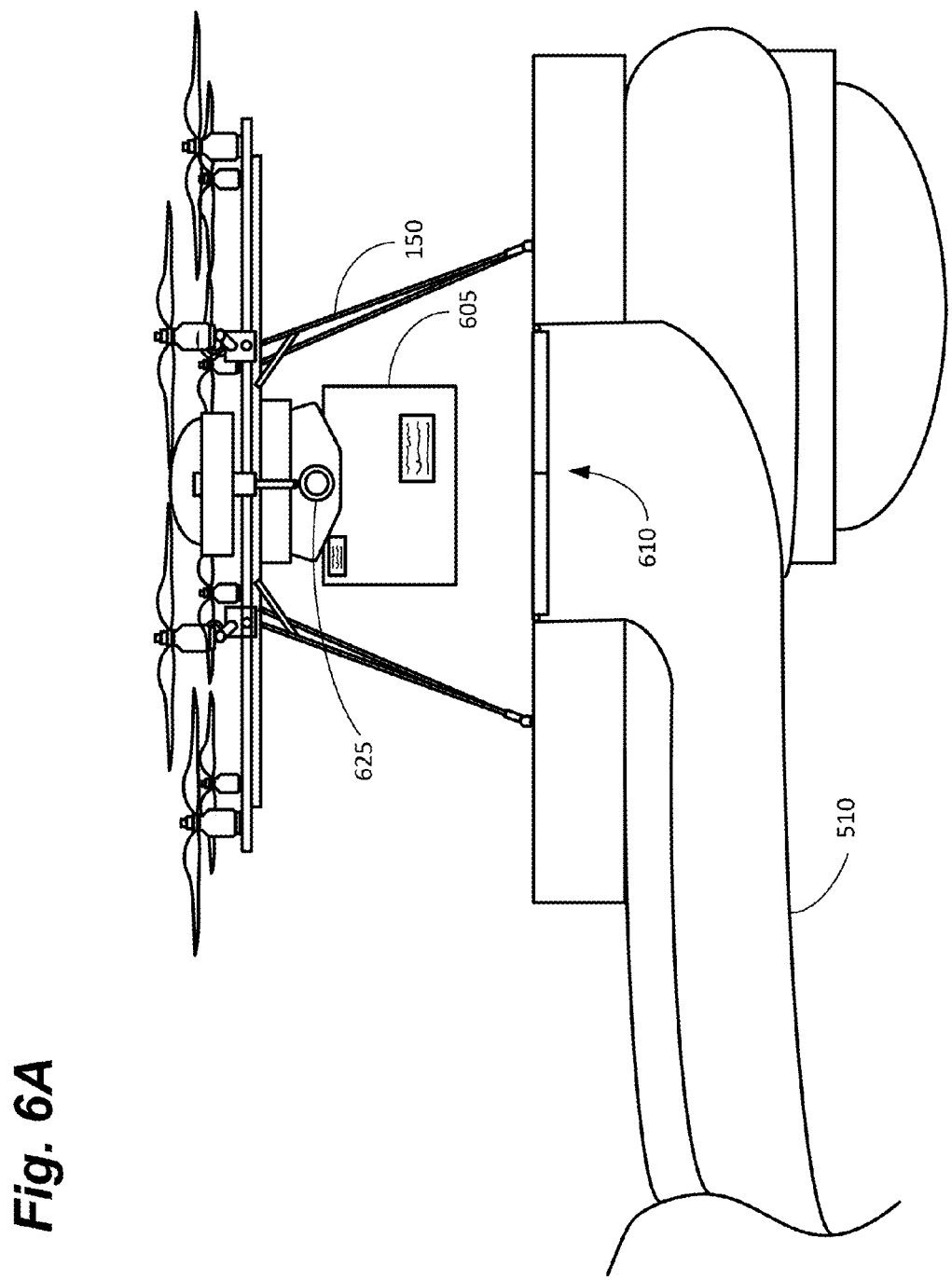
FIGS. 6A-6B depict a UAV docking station with an integrated package system, in accordance with some examples of the present disclosure.
Figure 6B:
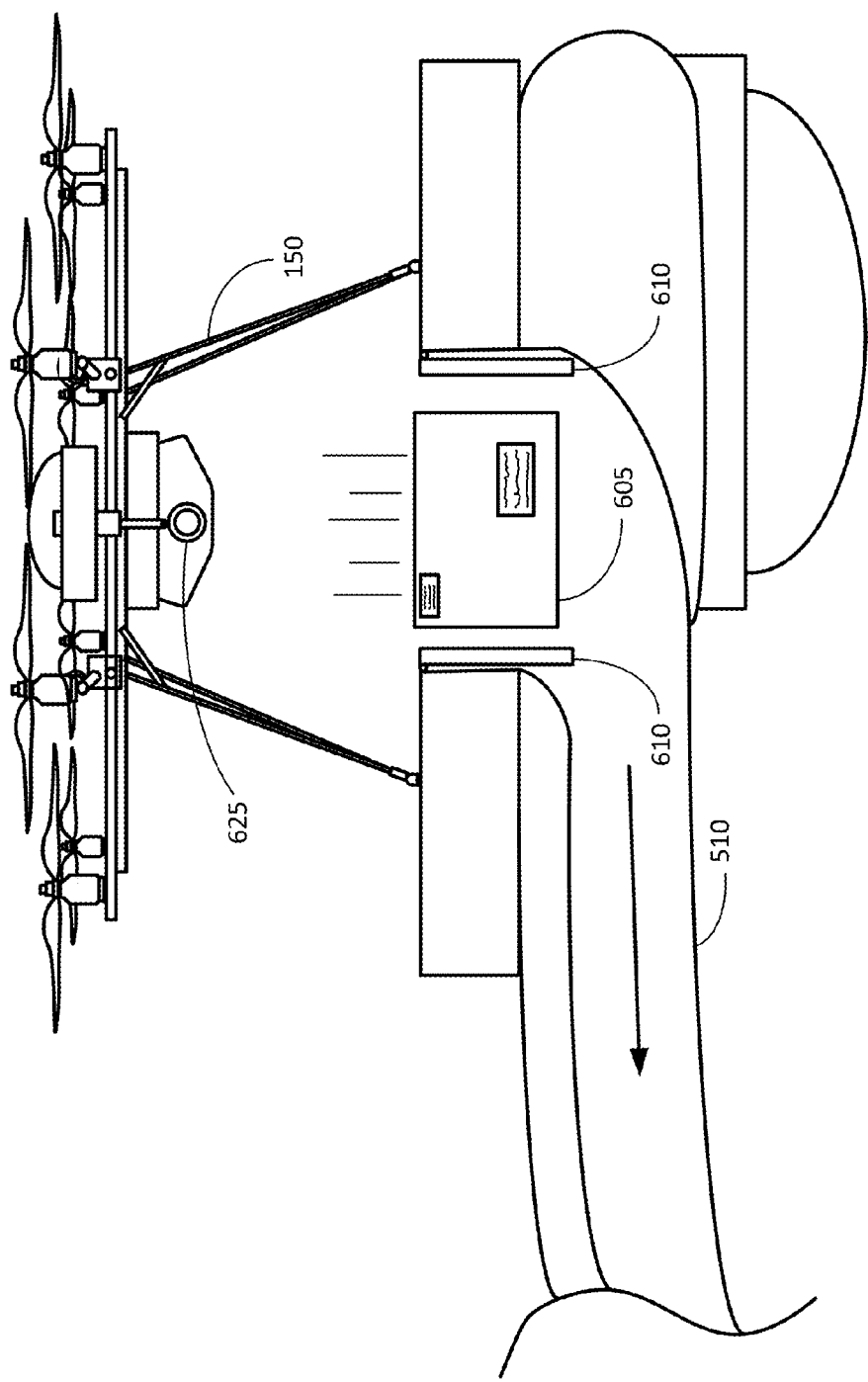

As shown in FIGS. 6A and 6B, in some examples, the platform 115 can comprise an access door 610 to the package transfer system 510. In some examples, as shown the access door 610 can comprise one or more trap doors. In other examples, the access door 610 can comprise, for example, a sliding door, a roll-up door, or other type of door to provide access to the package transfer system 510, while reducing, or eliminating, the infiltration of water, dirt, and debris into the package transfer system 510.

In some examples, the access door 610 can be spring-loaded and can open under the weight of the package. In other examples, the access-door 610 can be in short-range communication with the UAV 105 (e.g., RFID, wireless, etc.) and can open upon receiving a signal from the UAV 105. In still other examples, as mentioned above, the central control 150 can track and control a plurality of UAVs 105. In this configuration, the central control 150 can be in communication with the UAV 105 and/or the access door 610 and can send a signal to the access door 610 to open and close.

Prior to the arrival of a UAV 105 that has a package for that location, the access door(s) 610 can be closed, as shown in FIG. 6A. When the UAV 105 lands on the platform, communication between the UAV 105 and the access door 610 or the access door 610 and the central control can be initiated. Upon receiving the appropriate command, the access door 610 can open and the UAV 105 can drop the package 605 into the package transfer system 510, as shown in FIG. 6B. Of course, in some examples, to prevent damage, the UAV 105 may lower the package into the package transfer system 510 or the package transfer system 510 may be padded or curved to reduce the impact.

In some examples, the UAV 105 can also comprise a camera 625. The camera 625 can comprise a standard video camera and/or can comprise, for example, an infrared camera, a night vision camera, sonar receiver, and radar receiver. The camera 625 can enable the UAV 105 to, for example, locate the platform 115, align with the package handling system 510, and refuel/recharge. In some examples, the camera 625 can also provide remote video feeds to enable monitoring of weather and light conditions, crime, traffic, and other information.

As shown in FIG. 7, to encourage municipalities, neighborhoods, and individuals to allow installations of multiple docking stations 102, the docking stations 102 may also include a number of mutually beneficial features. In some examples, the docking station 700 can include a street light 705. In selected examples, instead of being mounted on an existing street light, the service provider may include a new street light with the installation.

Similarly, the docking stations 700 can act as primary or supplementary (relay) cell towers. To this end, the docking stations can include cellular antennas 710, switches, and other equipment to act as cell tower. In addition, in some cases, the docking stations 700 can also include wireless internet, or "Wi-Fi," connections 715. This can not only enable the UAV 105 to talk to the central control (i.e., the central facility 170 shown in FIG. 1C) and the docking station 102 but also can provide local free or fee-based Wi-Fi services. This can enable cities to provide free Wi-Fi in public parks, buildings, and other public areas without bearing the burden of installing some, or all, of the necessary infrastructure.

In still other examples, the docking stations 700 can include video cameras 720. These can be used by local authorities for traffic monitoring and crime prevention, among other things. In some configurations, the docking stations 700 can also include weather stations 725. The weather stations 725 can provide wind speed and direction, temperature, and other weather related information to both the UAVs 105, the central control 150, and to local residents, businesses, and government entities. In this manner, the UAVs 105 and central control 150 can create efficient routes for the UAVs to avoid, for example, excessive winds, head winds (which can negatively affect flight range), and severe weather. Similarly, a networked series of docking stations 700 can provide highly granular weather reporting without the need for separate infrastructure.

In yet other examples, the docking stations 700 can further comprise one or more solar panels 730. The solar panels 730 can be used, for example, to power the docking station 700, the docking station accessories (e.g., the weather stations 725) or to provide energy to the recharging station 205. In some examples, the solar panels 730 may be connected to an electrical grid as shown in FIG. 1A to offset the cost of system.

In still other examples, the docking station 700 can comprise one or more GPS receivers 735. In some examples, the docking station 700 can send GPS coordinates to the UAV 105 when it is positioned on the platform 115 to enable the UAV 105 to calibrate or "zero-out" its navigational system. In other words, the location of the docking station 700 can be measured very accurately using a relatively sophisticated GPS receiver 735, land surveying equipment, or other means. The docking station 700 can then provide this corrected GPS location to the UAV 105, which may have a relatively simpler GPS system with some inherent error. This can provide a correction factor to the UAV 105 to increase the accuracy of the onboard GPS system.

In other examples, the docking station 700 can comprise the same type of GPS receiver 735 as that used on the UAV 105. In that manner, the docking station 700, which is stationary, can compare the GPS location provided by the GPS receiver 735 to the known GPS location, calculate a correction factor, and provide the correction factor to the onboard GPS receiver on the UAV 105. In some examples, because all of the docking stations 700 are networked, the GPS receivers 735 on the docking stations 700 can provide a local area correction by combining the correction factor from two or more docking stations 700.

Figure 8:
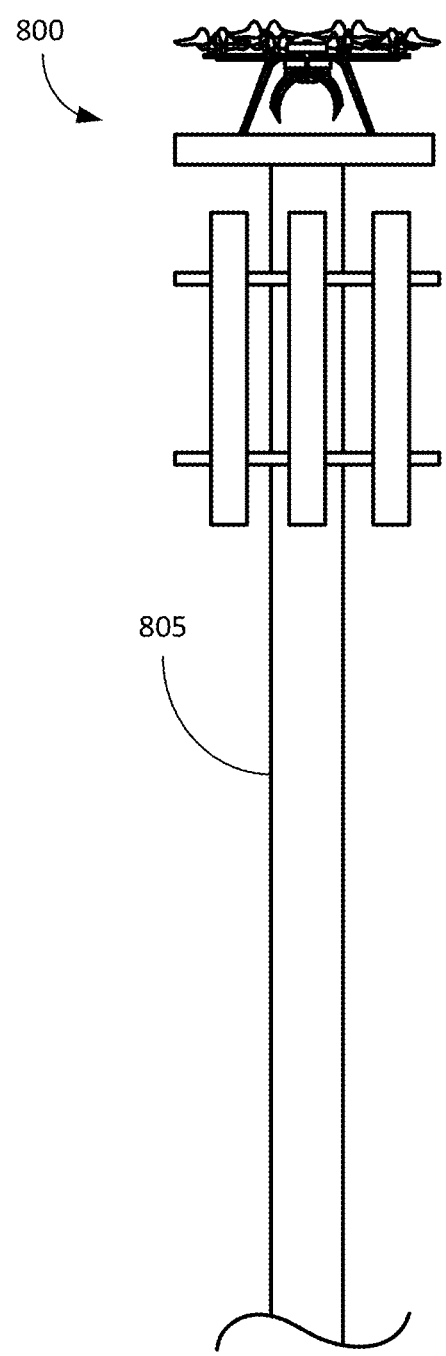
FIG. 8 depicts a UAV docking station incorporated into a cellular phone tower, in accordance with some examples of the present disclosure.

As shown in FIG. 8, the docking station 800 may be mounted on, or may include, a cell tower 805. This can provide cell towers 805 in more remote locations than would otherwise be financially prudent, for example, because the cost of the tower can be absorbed, or at least shared, with the package delivery company using the UAVs 105. So, for example, the company could either partner with a cell phone provider to share costs, or could enter cell phone market themselves to defray the costs of the docking stations 800.

Examples of the present disclosure can also comprise a method 900 for routing UAVs to deliver packages. In some examples, the package can be received at a central facility, as shown at 905. As mentioned above, the central facility can comprise, for example, a local or regional package sorting and handling facility. At the central facility, the central control can determine the size, weight, and final destination of the package can be determined, as shown at 910. This information can be derived from the package ID, such as a tracking number or bar code.

The central control can then choose an appropriate UAV based on the size and weight of the package, delivery time, and weather conditions, among other things. The central control can then generate a flight plan, comprising one or more segments, for the chosen UAV, as shown at 915. The flight plan can be chosen based on current wind and weather conditions, package delivery time, and UAV flight speed, among other things, and can include segments.

The central control can then ensure that the flight plan segments do not exceed the maximum range of the chosen UAV, as shown at 920. If none of the segments exceeds the UAV's range, the central control can send the flight plan to the UAV for execution, as shown at 925. In other words, if the UAV has sufficient range to deliver the package directly (e.g., the final destination is relatively close to the central facility, the UAV can fly directly to the final destination.

If any of the flight segments do exceed the maximum range of the UAV, on the other hand, the central control can add segments and stops at intervening docking stations, as necessary, as shown at 930. The docking stations can enable the UAV to land, refuel/recharge, and then continue along the flight path to the final destination. When a sufficient number of intervening docking stations have been added to the flight plan to provide sufficiently short flight segments, the flight plan can be sent to the UAV for execution, as shown at 925.

Figure 9A:
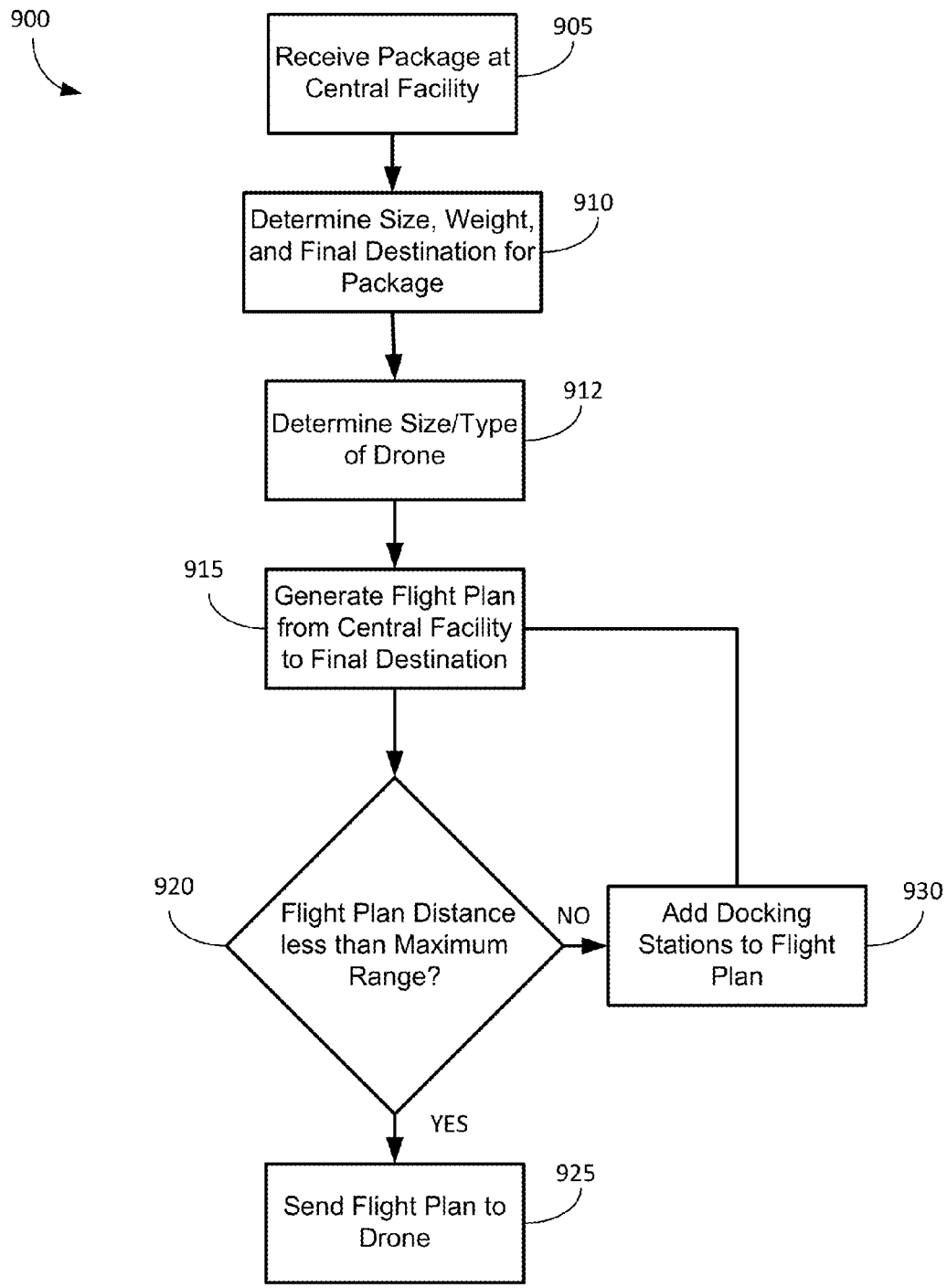
FIG. 9A depicts a method for routing a UAV to deliver a package, in accordance with some examples of the present disclosure.
Figure 9B:
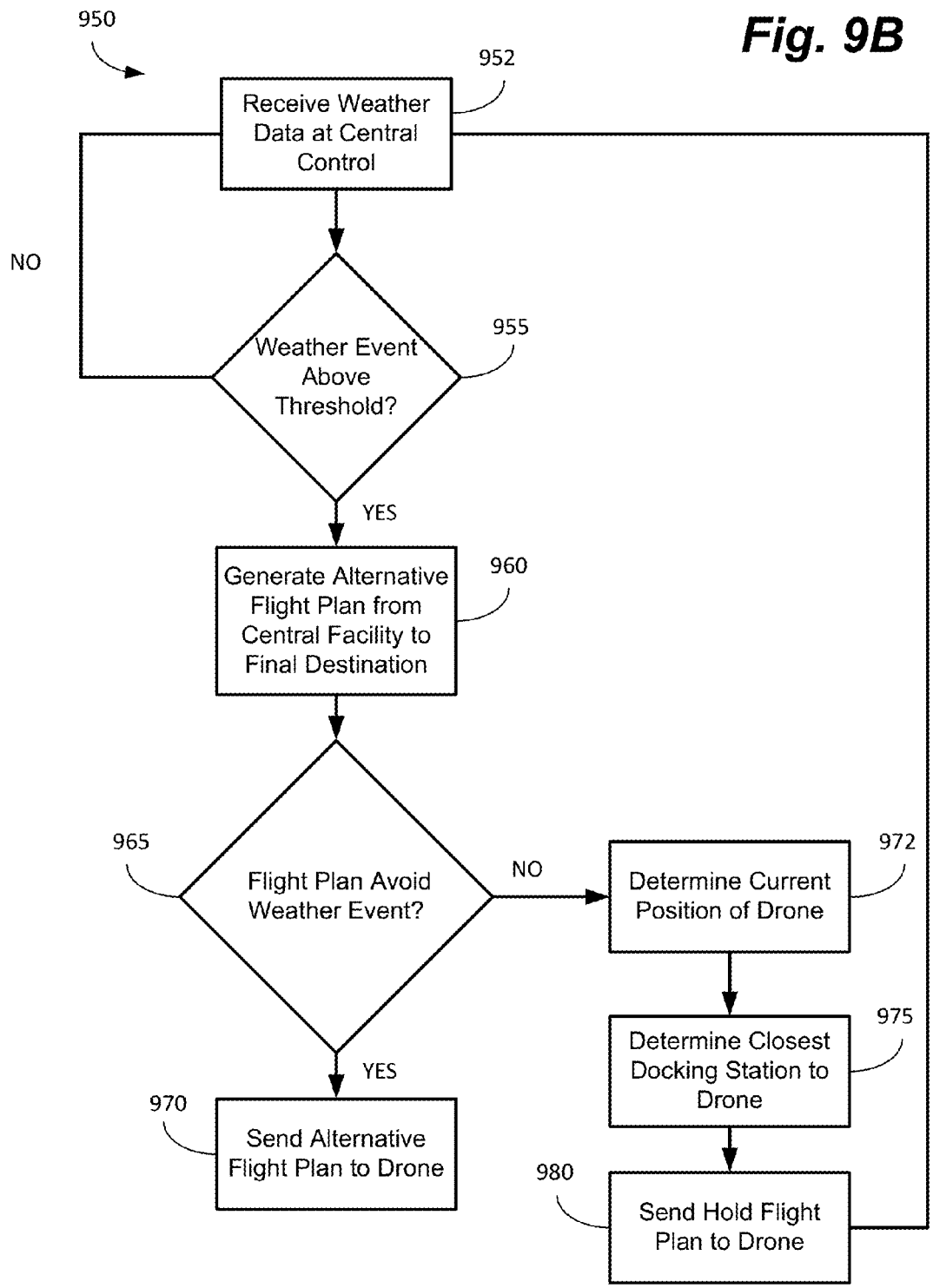
FIG. 9B depicts a method for rerouting a UAV to avoid a weather event, in accordance with some examples of the present disclosure.

In some cases, the flight plan may need to be modified to account for changing weather conditions, as shown in FIG. 9B. As a result, examples of the present disclosure can also comprise a method 950 for rerouting UAV to avoid significant weather issues. In some examples, the central control can receive weather information from one, some, or all of the docking stations, as shown at 950. In some example, each docking station can comprise a weather station. This can provide the central control with a very granular weather picture for the delivery area. This can enable the system to identify localized weather events such as, for example, thunderstorms, which tend to be fairly small and localized, but violent.

In some examples, the central control can determine if the weather event exceeds a certain threshold, as shown at 955. In other words, the central control can determine, for example, whether the wind is in a certain direction (e.g., a headwind for the UAV) and/or exceeds a predetermined speed. If, for example, a UAV has a top speed of 10 mph (or 15 or 20 mph), then any headwind above this mark would prevent flight. In addition, the threshold can be set somewhat lower, such that any speed above 5 mph (or 10 mph or 15 mph, respectively) is deemed to inefficient to continue. Wind speed threshold can be set, for example, as an absolute value or a percentage of the top speed of the UAV.

Similarly, the UAV may be able to continue rather easily in a light rain, while rainfall above a certain rate (e.g., 1 inch/hour) makes flying inefficient or impossible. UAVs may also be unable to fly in extremely cold or extremely hot weather due to battery losses at these temperatures. As a result, the weather event thresholds can be set for each size and type of UAV, for a certain package size and/or weight, or other factors and combinations of factors.

If the system determines that the weather event is below the predetermined threshold, then system can continue to receive weather updates from the docking stations, as shown at 952. If, on the other hand, the weather event exceeds the predetermined threshold, the central control can generate an alternative flight plan in an attempt to avoid the weather event, as shown at 960. If, for example, the weather event is a fairly localized thunderstorm, the system can simply route the UAV around the weather event. If the weather event can be avoided, the alternate flight plan can be sent to the UAV for execution, as shown at 970. As before, the flight plan can include a necessary number of docking stations to route the UAV to the final destination.

If, on the other hand, the weather event is more widespread, it may be impossible or impractical for the central control to route the UAV around the weather event. In this case, the central control can determine the current location of the UAV, as shown at 972, and then determine the location of the closest docking station to the current location, as shown at 975. In some examples, this can comprise the closest available docking station (e.g., the closest docking station may already be occupied). The central control can then send a "hold" flight plan to the UAV to fly to the closest docking station and hold for the weather to clear, as shown at 980. In some examples, the UAV can take advantage of the UAV securing system 305 at the docking station to prevent damage during the weather event.

Figure 10A:
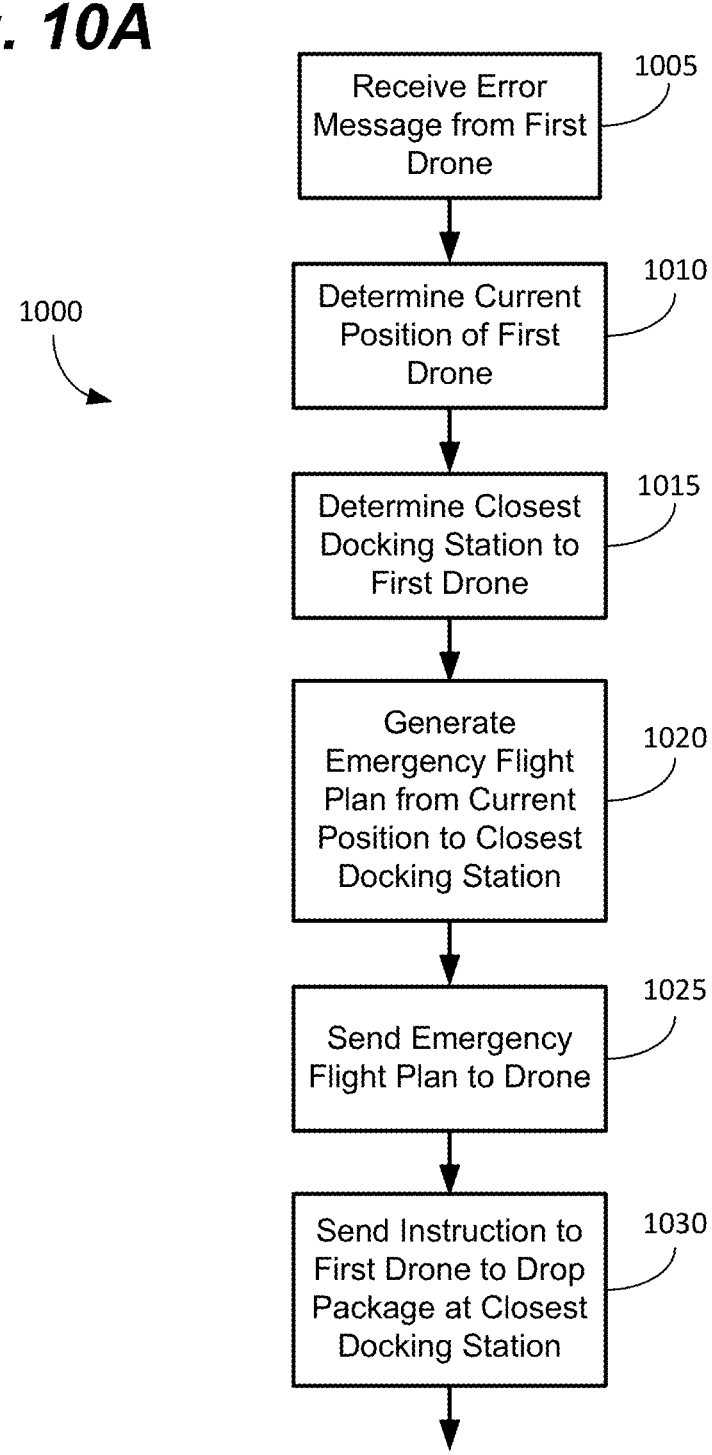
FIGS. 10A-10B depict a method for routing a second UAV to deliver a package when a first UAV has a problem, in accordance with some examples of the present disclosure.
Figure 10B:
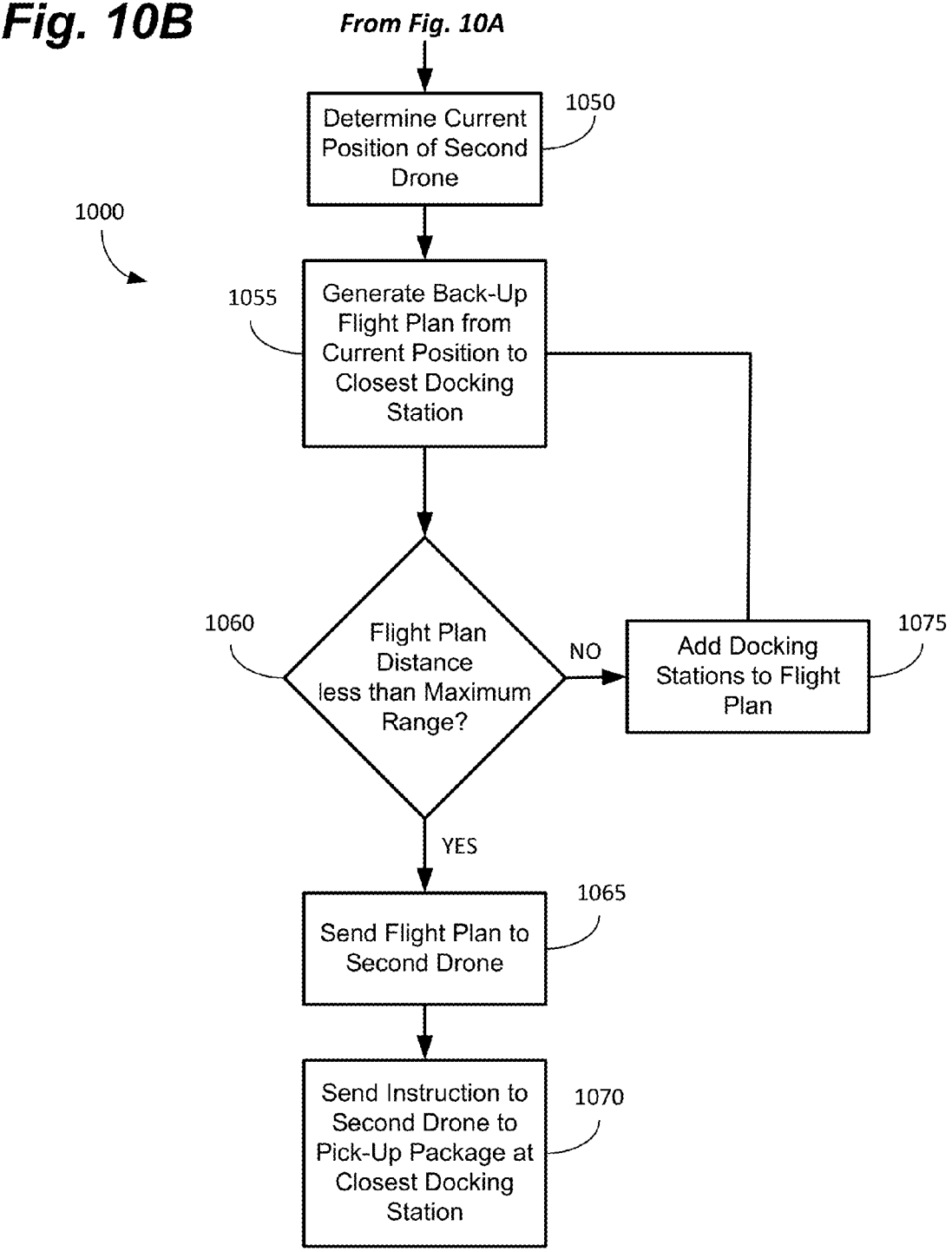
Figure 11A:
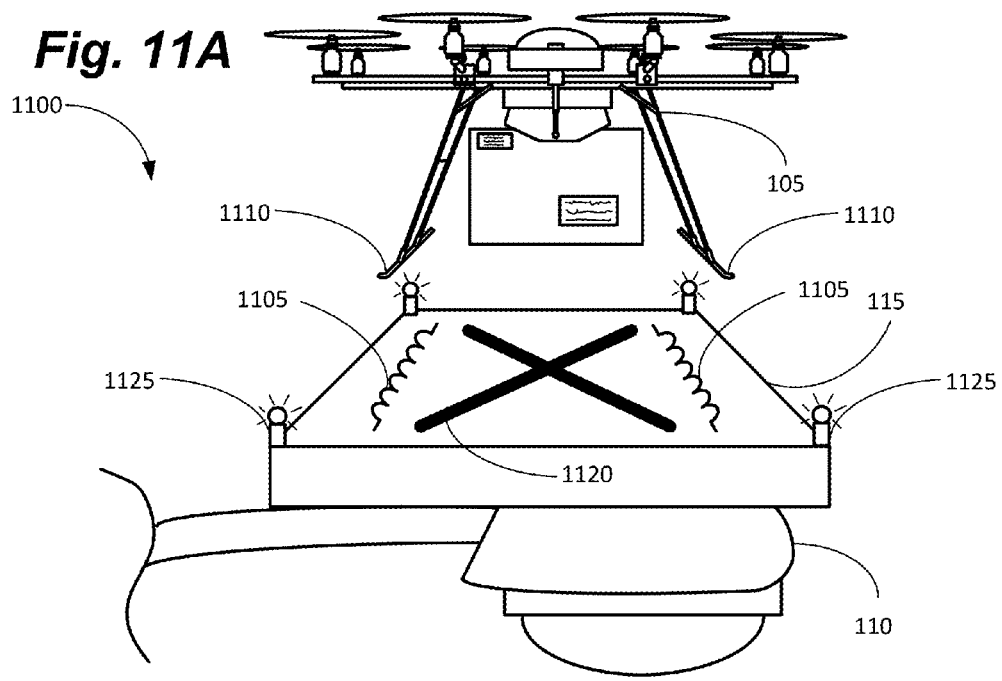
FIGS. 11A-11B depict a third UAV hold-down system, in accordance with some examples of the present disclosure.
Figure 11B:
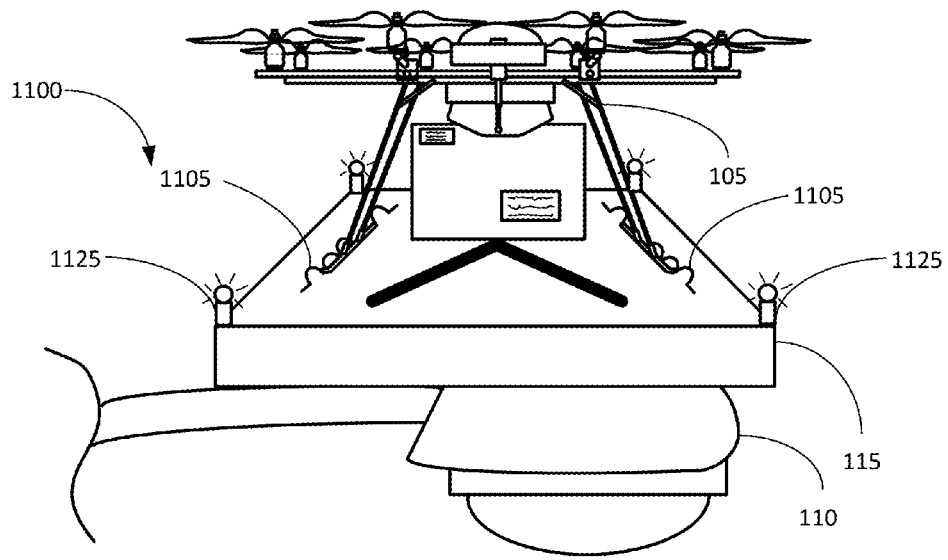

It is inevitable that UAVs with have electronic or mechanical failures in service. As a result, as shown in FIGS. 10A and 10B, in some examples the system can also include a method 1000 for rerouting UAVs to account for mechanical, electrical, or other technical issues. In some examples, the UAV can comprise an on-board diagnostic system comprising a plurality of error codes. These codes can refer to, for example, battery and motor overheating, low battery charge or fuel level, low motor RPM, and higher than normal power settings (e.g., the current from the battery is higher than normal for the current load and conditions).

Regardless of the problem, a first UAV can send an error code to the central control, as shown at 1005. Upon receiving the error code, the central control can (1) determine the current location of the first UAV, as shown at 1010 and (2) determine a first docking station for the first UAV, as shown at 1015. Of course, in some cases, the first docking station will be chosen because it is the closest docking station. In other cases, the closest docking station may be occupied, for example, and the first docking station can be the closest available docking station. In still other cases, such as when the stricken UAV cannot fly to a farther docking station, the central control can send a flight plan to a UAV that is occupying the closest docking station moving it to another docking station. After determining the appropriate docking station, the central control can generate an "emergency" flight plan for the first UAV from the UAV's current location to the first docking station, as shown at 1020.

The central control can then send the emergency flight plan to the first UAV, as shown at 1025. If the error is an unexpected loss of power such as a defective battery pack, for example, the first UAV may be able to receive a charged battery pack from the first docking station and continue on to the final destination. If, on the other hand, the UAV is unable to continue (e.g., one or more motors on the UAV have failed), then the central control can send an instruction to the first UAV to drop the package at the first docking station, as shown at 1030.

As shown in FIG. 10B, if the first UAV is unable to continue, the method 1000 can continue with the central control determining the current position of a second UAV, as shown at 1050. The second UAV may be the closest UAV to the first docking station, the closest available UAV, or the closest UAV with the appropriate carrying capacity for the package, for example. The central control can then generate a "back-up" flight plan for the second UAV to the first docking station, as shown at 1055. If the back-up flight plan is determined to be within the range of the second UAV, as shown at 1060, the central control can send the back-up flight plan to the UAV, as shown at 1065.

If, on the other hand, the back-up flight plan is determined to exceed the range of the second UAV, as shown at 1055, the central control can add docking stations to the flight plan, as necessary, as shown at 1075. The central control can then send the modified back-up flight plan to the second UAV, as shown at 1065. In some examples, the central control can also send instructions to the second UAV to pick up the package from the first docking station, as shown at 1070. The second UAV can then be routed to the final destination, as discussed above.

In some examples, the platform 115 can comprise one or more electromagnets 1105 and the UAV 105 can comprise one or more ferromagnetic components 1110. In some cases, for example, some or all of the skids 1110 on the UAV 105 can comprise a ferromagnetic material. In some examples, the skids 1110 can comprise ferromagnetic pucks or strips. In this manner, when activated, the electromagnets 1105 can secure the UAV 105 to the platform 115, but release the UAV 105 when deactivated. In some examples, the electromagnets 1105 can also comprise a battery back-up system to ensure the UAV 105 can be secured during power outages. This may be particularly relevant in weather related power outages, for example.

In some examples, the platform 115 can also include additional features. The platform 115 can comprise, for example, one or more landing patterns 1120. In some examples, the landing patterns 1120 can comprise high contrast, reflective, or other markings, such as an X, which can be easily identified by the UAVs video camera 625. The landing patterns 1120 can provide a target location for the UAV 105 and can align the UAV 105 with, for example, the package handling system 510 or the securing system 305. In some areas, the platform 115 can also comprise pigeon spikes, scarecrows, artificial owls, overhangs, or other deterrents to limit wildlife interference with platform 115 operations.

In some examples, the platform 115 can also comprise one or more beacons 1125. The beacons 1125 can comprise, for example, flashing landing lights, radio beacons, homing beacons, or other indicia to enable the UAV 105 to locate the elevated landing platform 115. The beacons 1125 can enable the UAV 105 to locate the platform in adverse weather conditions, for example, or at night. In some examples, the beacons 1125 can comprise radio beacons to aid navigation in areas with high light pollution (e.g., in city centers), where landing lights may be difficult to distinguish from surrounding city lights. In still other examples, the beacons 1125 can comprise a glide slope, ILS, or other instrumentation to facilitate landing.

While several possible examples are disclosed above, examples of the present disclosure are not so limited. For instance, while a system of docking stations for UAVs to deliver packages is disclosed, other UAV tasks could be selected without departing from the spirit of the disclosure. In addition, the location and configuration used for various features of examples of the present disclosure such as, for example, the location of the package transfer system and lockers, the number and type of services provided by the docking station, and the locations and configurations of the docking station can be varied according to a particular neighborhood or application that requires a slight variation due to, for example, size or construction covenants, the type of UAV required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A method to deliver packages via an unmanned aerial vehicle (UAV), the method comprising:
   receiving a package at a central facility;
   mapping, via a central control, a first flight path of a first UAV from the central facility to a final destination of the package, the first flight path comprising two or more segments and one or more stops at one or more docking stations between the central facility and the final destination;
   instructing the first UAV to follow the first flight path;
   receiving at the central control, weather data from one or more weather stations;
   receiving at the central control, a current position of the first UAV;
   identifying a closest docking station from the current position of the first UAV;
   mapping a second flight path from the current position of the first UAV to the identified closest docking station in response to the weather data;
   instructing the first UAV to follow the second flight path in response to the weather data;
   instructing the first UAV to drop the package at the identified closest docking station;
   receiving a current position from a second UAV;
   mapping a third flight path from the current position of the second UAV to the identified closest docking station; and
   instructing the second UAV to follow the third flight path.

2. The method of claim 1, wherein each of the two or more segments of the flight path is between two of the central facility, a docking station, and the final destination.

3. The method of claim 1, further comprising:
   receiving an error code from the second UAV;
   receiving a current position from the second UAV;
   identifying a closest docking station to the current position of the second UAV;
   mapping a fourth flight path from the first current position of the second UAV to the identified closest docking station; and
   instructing the second UAV to follow the fourth flight path.

4. The method of claim 3, wherein identifying a closest docking station from the current position of the second UAV further comprises identifying the closest unoccupied docking station.

5. The method of claim 1, wherein identifying a closest docking station from the current position of the first UAV further comprises identifying the closest unoccupied docking station.

6. The method of claim 1, further comprising:
   receiving a communication from the UAV at a first docking station; and
   transmitting the communication from the first docking station to the central control.

7. The method of claim 1, further comprising:
   measuring a weight, a size, or both of the package; and
   calculating the maximum flying range for the UAV based on the measured weight, size, or both of the package.

8. The method of claim 1, further comprising:
   measuring a weight of the package; and
   determining a size for the UAV based on the measured weight, size, or both of the package.

9. A method to deliver packages via an unmanned aerial vehicle (UAV), the method comprising:
   receiving a package at a central facility;
   mapping, via a central control, a first flight path of a first UAV from the central facility to a final destination of the package, the first flight path comprising two or more segments and one or more stops at one or more docking stations between the central facility and the final destination;
   instructing the first UAV to follow the first flight path;
   receiving an error code from the first UAV;
   receiving a current position from the first UAV;
   identifying a closest docking station to the current position of the first UAV;
   mapping a second flight path from the current position of the first UAV to the identified closest docking station;
   instructing the first UAV to follow the second flight path in response to receiving the error code;
   instructing the first UAV to drop the package at the identified closest docking station;
   receiving a current position from a second UAV;
   mapping a third flight path from the current position of the second UAV to the identified closest docking station; and
   instructing the second UAV to follow the third flight.

10. The method of claim 9, wherein each of the two or more segments of the first flight path is between two of the central facility, a docking station, and the final destination.

11. The method of claim 9, further comprising:
    receiving at the central control, weather data from one or more weather stations;
    receiving at the central control, a current position of the second UAV;
    identifying a closest docking station from the current position of the second UAV;
    mapping a fourth flight path from the current position of the second UAV to the identified closest docking station; and
    instructing the second UAV to follow the fourth flight path.

12. The method of claim 11, wherein identifying a closest docking station from the current position of the second UAV further comprises identifying the closest unoccupied docking station.

13. The method of claim 9, wherein identifying a closest docking station from the current position of the first UAV further comprises identifying the closest unoccupied docking station.

14. The method of claim 9, further comprising:
    receiving data from one or more weather stations along the third flight path;
    mapping a fourth flight path for the second UAV from the identified closest docking station to the final destination of the package based on the weather station data; and
    instructing the second UAV to follow the fourth flight path.

15. The method of claim 9, further comprising:
    receiving a communication from the first UAV at a first docking station; and
    transmitting the communication from the first docking station to the central control.

16. The method of claim 9, further comprising:
    measuring a weight, a size, or both of the package; and
    calculating the maximum flying range for the UAV based on the measured weight, size, or both of the package.

17. The method of claim 9, further comprising:
    measuring a weight of the package; and
    determining a size for the UAV based on the measured weight, size, or both of the package.

18. A method to deliver packages via an unmanned aerial vehicle (UAV), the method comprising:

receiving a package at a central facility;
mapping, via a central control, a first flight path of a first UAV from the central facility to a final destination of the package;
instructing the first UAV to follow the first flight path;
receiving at the central control, weather data from one or more weather stations;
receiving at the central control, a current position of the first UAV;
identifying a closest docking station from the current position of the first UAV;
mapping a second flight path from the current position of the first UAV to the identified closest docking station in response to the weather data;
instructing the first UAV to follow the second flight path in response to the weather data;
instructing the first UAV to drop the package at the identified closest docking station;
receiving a current position from a second UAV;
mapping a third flight path from the current position of the second UAV to the identified closest docking station; and
instructing the second UAV to follow the third flight path.

19. The method of claim 18, wherein identifying a closest docking station from the current position of the first UAV further comprises identifying the closest unoccupied docking station.

20. The method of claim 18, further comprising:
receiving a communication from the first UAV at a first docking station; and
transmitting the communication from the first docking station to the central control.

21. The method of claim 18, wherein each of the one or more weather stations is located on a docking station.

22. The method of claim 18, further comprising:
measuring a weight, a size, or both of the package; and
calculating the maximum flying range for the first UAV based on the measured weight, size, or both of the package;
wherein the first flight path comprises two or more segments and one or more stops at one or more docking stations between the central facility and the final destination; and
wherein a distance for each segment of the one or more segments is equal to or shorter than the calculated maximum flying range for the first UAV.

* * * * *